US012368389B2

(12) United States Patent
Sugawara

(10) Patent No.: US 12,368,389 B2
(45) Date of Patent: Jul. 22, 2025

(54) INTEGRATED CIRCUIT AND POWER SUPPLY CIRCUIT

(71) Applicant: FUJI ELECTRIC CO., LTD., Kawasaki (JP)

(72) Inventor: Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 229 days.

(21) Appl. No.: 18/174,004

(22) Filed: Feb. 24, 2023

(65) Prior Publication Data

US 2023/0336093 A1   Oct. 19, 2023

(30) Foreign Application Priority Data

Apr. 13, 2022  (JP) .................................. 2022-066546

(51) Int. Cl.
*H02M 7/217* (2006.01)
*H02M 1/00* (2006.01)
(Continued)

(52) U.S. Cl.
CPC ....... *H02M 7/2176* (2013.01); *H02M 1/0009* (2021.05); *H02M 1/143* (2013.01); *H02M 1/4225* (2013.01)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538;
(Continued)

(56) References Cited

U.S. PATENT DOCUMENTS 5,867,379 A * 2/1999 Maksimovic ....... H02M 1/4225
323/222
8,174,855 B2 * 5/2012 Ribarich ................... G05F 1/70
363/89

(Continued)

FOREIGN PATENT DOCUMENTS

JP   H11-98820 A    4/1999
JP   2006-094697 A  4/2006
JP   2010-115105 A  5/2010

*Primary Examiner* — Sean Kayes
*Assistant Examiner* — Nusrat Quddus
(74) *Attorney, Agent, or Firm* — Rabin & Berdo, P.C.

(57) ABSTRACT

An integrated circuit for a power supply circuit that generates an output voltage from an alternating current (AC) voltage, the power supply circuit including a transistor configured to control a current flowing through an inductor. The integrated circuit comprises: a first terminal, to which a first capacitor is coupled, that receives a voltage corresponding to the AC voltage; a driver circuit turns on the transistor in response to a predetermined condition being satisfied, and turns off the transistor based on a feedback voltage corresponding to the output voltage and the voltage corresponding to the AC voltage, an ON period of the transistor inversely correlating to a level of the voltage corresponding to the AC voltage; and a discharge circuit that discharges the first capacitor in a time period from a first timing at which the transistor is turned off to a second timing at which the transistor is turned on.

16 Claims, 20 Drawing Sheets

(51) Int. Cl.
*H02M 1/14* (2006.01)
*H02M 1/42* (2007.01)

(58) Field of Classification Search
CPC ......... H02M 3/33546; H02M 3/33515; H02M 3/33576; H02M 3/33592; H02M 3/33553; H02M 3/33523; Y02B 70/1491
See application file for complete search history.

(56) References Cited

U.S. PATENT DOCUMENTS

| | | | |
|---|---|---|---|
| 11,233,448 B2* | 1/2022 | Endo | H02M 1/08 |
| 2006/0061337 A1 | 3/2006 | Kim et al. | |
| 2007/0247121 A1* | 10/2007 | Wu | G05F 1/70 |
| | | | 323/222 |
| 2010/0118571 A1 | 5/2010 | Saint-Pierre | |
| 2011/0075448 A1* | 3/2011 | Melanson | H02M 3/156 |
| | | | 363/20 |
| 2012/0250381 A1* | 10/2012 | Takahashi | H02M 1/4225 |
| | | | 363/124 |
| 2019/0081553 A1* | 3/2019 | Sugimoto | H02M 1/4225 |
| 2020/0395843 A1* | 12/2020 | Hiasa | H02M 1/08 |

* cited by examiner

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2022-066546 filed on Apr. 13, 2022, the entire disclosure of which is hereby incorporated by reference herein.

BACKGROUND

Technical Field

The present disclosure relates to an integrated circuit and a power supply circuit.

Description of the Related Art

Conventionally, power supply circuits that output an alternating current (AC) voltage of a target level from an alternating current power supply to a load may use integrated circuits that control the on period of a transistor according to the phase angle of a rectified voltage (see, for example, Japanese Patent Application Publication Nos. H11-98820, 2010-115105, and 2006-94697).

In general, such an integrated circuit includes a terminal to receive a voltage corresponding to the rectified voltage. Incidentally, if a capacitor for surge protection is coupled to the terminal to receive the voltage corresponding to the rectified voltage, the integrated circuit may not be able to appropriately control the on period of the transistor, which may result in deterioration of power factor.

SUMMARY

A first aspect of an embodiment of the present disclosure is to provide an integrated circuit for a power supply circuit configured to generate an output voltage of a target level from an alternating current (AC) voltage, the power supply circuit including an inductor configured to receive a rectified voltage corresponding to the AC voltage, a transistor configured to control an inductor current flowing through the inductor, and a first capacitor, the integrated circuit being configured to switch the transistor. The integrated circuit comprises: a first terminal configured to receive a voltage corresponding to the AC voltage, the first terminal being coupled to the first capacitor; a driver circuit configured to turn on the transistor in response to a predetermined condition being satisfied, and turn off the transistor based on a feedback voltage corresponding to the output voltage and the voltage corresponding to the AC voltage, an on period of the transistor, during which the transistor is on, inversely correlating to a level of the voltage corresponding to the AC voltage; and a discharge circuit configured to discharge the first capacitor in a time period from a first timing at which the transistor is turned off to a second timing at which the transistor is turned on.

A second aspect of an embodiment of the present disclosure is to provide a power supply circuit configured to generate an output voltage of a target level from an alternating current (AC) voltage, the power supply circuit comprising: an inductor configured to receive a rectified voltage corresponding to the AC voltage; a transistor configured to control an inductor current flowing through the inductor; a first capacitor; and an integrated circuit configured to switch the transistor. The integrated circuit includes a first terminal configured to receive a voltage corresponding to the AC voltage, the first terminal being coupled to the first capacitor, a driver circuit configured to turn on the transistor in response to a predetermined condition being satisfied, and turn off the transistor based on a feedback voltage corresponding to the output voltage and the voltage corresponding to the AC voltage, an on period during which the transistor is on inversely correlating to a level of the voltage corresponding to the AC voltage, and a discharge circuit configured to discharge the first capacitor in a time period from a first timing at which the transistor is turned off to a second timing at which the transistor is turned on.

The above summary does not list all of the features of the present disclosure. Subcombinations of these feature groups may also be the disclosure.

BRIEF DESCRIPTION OF THE DRAWINGS

FIG. 1 illustrates an example of a configuration of an AC-DC converter 11a.

FIG. 2 illustrates an example of a configuration of a power factor correction integrated circuit (IC) 28a.

FIG. 3 illustrates an example of a configuration of an oscillator circuit 55a.

FIG. 16 illustrates an example of a configuration of a power factor correction IC 110a.

DETAILED DESCRIPTION

Figure 1:
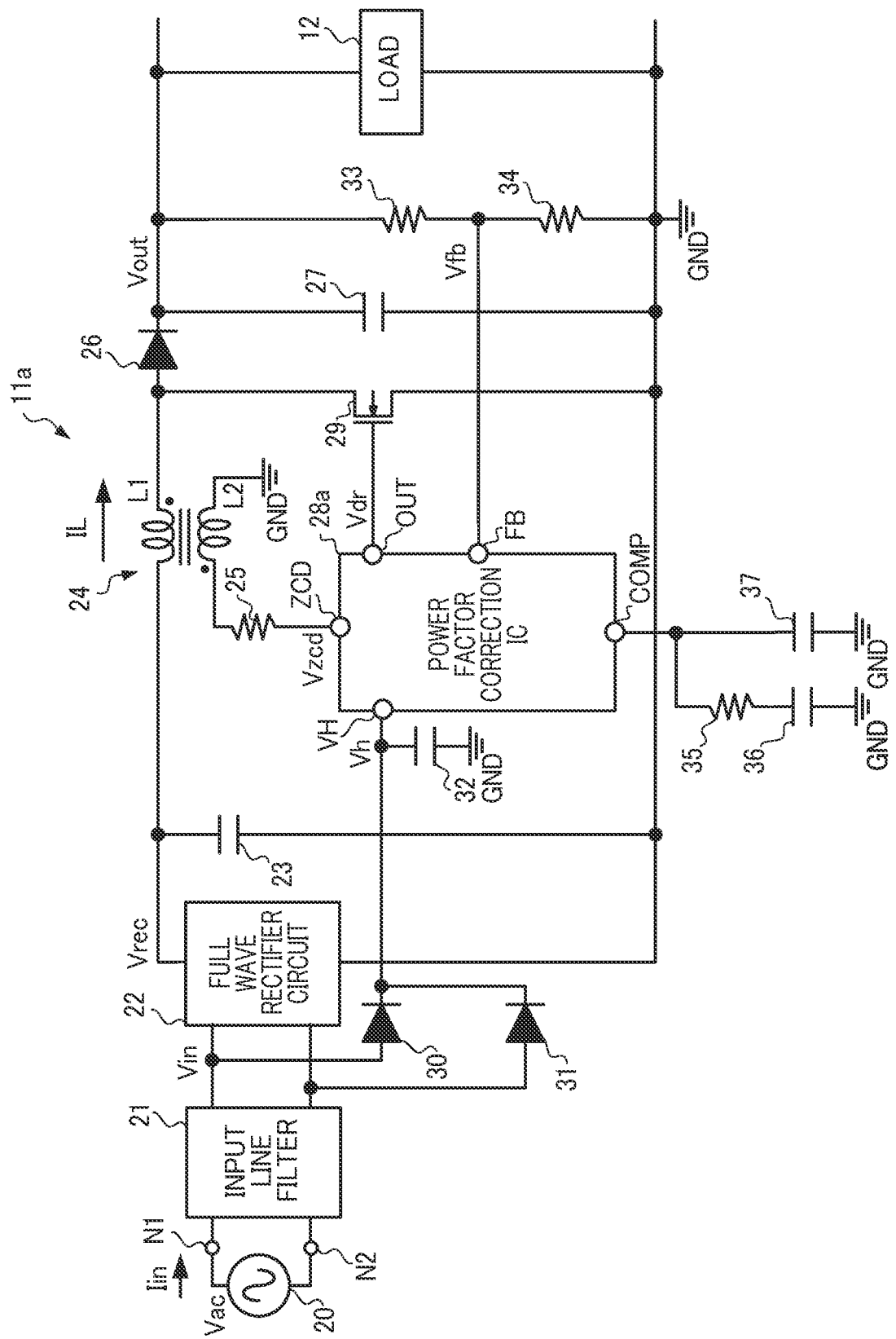

Hereinafter, the present disclosure will be described through embodiments of the disclosure. However, the following embodiments do not limit the disclosure according to the scope of the claims. In addition, not all the combinations of the features described in the embodiments are necessarily essential for solution in the disclosure. In addition, components, members, and the like that are the same or equivalent in drawings are given the same reference numerals, and description thereof is omitted as appropriate.

Herein, when the term "couple" is used, it means to "electrically couple" unless otherwise noted. Herein, a state where the logic level of a voltage or a signal is a high (High) level will be referred to as "high or high level", and a state where the logic level is a low (Low) level will be referred to as "low or low level".

FIG. 1 illustrates an example of a configuration of an AC-DC converter 11a. The AC-DC converter 11a is a boost chopper power supply circuit that generates an output voltage Vout of a target level from an alternating current (AC) voltage Vac of a commercial power supply. The output voltage Vout generated by the AC-DC converter 11a is used to drive a load 12.

The load 12 is, for example, a DC-DC converter or an electronic device that operates on direct current (DC) voltage.

The AC-DC converter 11a includes an input line filter 21, a full-wave rectifier circuit 22, capacitors 23, 27, 32, 36, 37, the transformer 24, the resistors 25, 33 to 35, diodes 26, 30, 31, a power factor correction integrated circuit (IC) 28a, and an N-channel metal-oxide-semiconductor (NMOS) transistor 29.

===Input to Full-Wave Rectifier Circuit 22===

An alternating current (AC) power supply 20 is a commercial AC power supply to supply an AC voltage Vac to the input line filter 21. The AC voltage Vac is, for example, a voltage in a range of from 100 to 277 V with a frequency in a range of from 50 to 60 Hz.

The input line filter 21 removes noise from the AC voltage Vac, to thereby supply an input voltage Vin to the full-wave rectifier circuit 22. The input line filter 21 is provided between the full-wave rectifier circuit 22 (described later) and nodes N1, N2 that receive the AC voltage Vac. Note that, in an embodiment of the present disclosure, the current at the nodes N1, N2 that receive the AC voltage Vac is referred to as input current Iin.

===Configuration from Full-Wave Rectifier Circuit 22 to Load 12===

The full-wave rectifier circuit 22 performs full-wave rectification of the input voltage Vin, to thereby apply a resultant voltage to the capacitor 23 and a main coil L1 of the transformer 24 as a rectified voltage Vrec.

The capacitor 23 smooths the rectified voltage Vrec supplied from the full-wave rectifier circuit 22.

The transformer 24 includes the main coil L1 through which an inductor current IL flows and an auxiliary coil L2 magnetically coupled to the main coil L1. In an embodiment of the present disclosure, the auxiliary coil L2 is formed by winding such that the voltage generated across the auxiliary coil L2 is opposite in polarity to the voltage generated across the main coil L1. The auxiliary coil L2 is coupled to a terminal ZCD of the power factor correction IC 28a (described later) through the resistor 25. A voltage Vzcd corresponding to the current flowing through the auxiliary coil L2 is applied to the terminal ZCD.

The main coil L1, the diode 26, the capacitor 27 and the NMOS transistor 29 configure a boost chopper circuit. This boost chopper circuit boosts the charging voltage of the capacitor 27 to the direct current (DC) output voltage Vout, to supply a resultant voltage to the load 12.

The power factor correction IC 28a is an integrated circuit that controls switching of the NMOS transistor 29 such that the output voltage Vout reaches a target level (e.g., 400 V) while improving the power factor of the AC-DC converter 11a.

The power factor correction IC 28a has terminals FB, COMP, OUT, VH, and the terminal ZCD. Note the power factor correction IC 28a has terminals other the above five terminals FB, COMP, OUT, VH, ZCD, however, they are omitted, for convenience.

The NMOS transistor 29 controls power to the load 12 of the AC-DC converter 11a. Note that, in an embodiment of the present disclosure, the NMOS transistor 29 is used as a so-called switching device, but it is not limited thereto. For example, as a switching device, a transistor such as a PMOS transistor, a bipolar transistor, or the like may be used.

Further, the gate electrode of the NMOS transistor 29 is coupled to the terminal OUT such that the NMOS transistor 29 is driven by a signal Vdr from the terminal OUT.

The diodes 30, 31 are coupled to the preceding stage of the full-wave rectifier circuit 22, and configure a full-wave rectifier circuit that applies a voltage Vh obtained by full-wave rectification of the input voltage Vin to the terminal VH of the power factor correction IC 28a.

The anode of the diode 30 is coupled to the line on the non-ground side in the preceding stage of the full-wave rectifier circuit 22. Meanwhile, the anode of the diode 31 is coupled to the line on the ground side in the preceding stage of the full-wave rectifier circuit 22. The cathodes of the diodes 30, 31 is coupled to the terminal VH of the power factor correction IC 28a. Note that such a divided voltage as obtained by dividing the voltage at the cathodes of the diodes 30, 31 may be applied to the terminal VH of the power factor correction IC 28a.

Here, a capacitor 32 to protect the power factor correction IC 28a from high voltage noise (surge) such as lightning discharge is coupled to the terminal VH. As an example, the capacitor 32 has a capacitance of 100 pF. However, the capacitor 32 may have a different capacitance depending on the withstand voltage of the power factor correction IC 28a.

The resistors 33, 34 configure a voltage divider circuit that divides the output voltage Vout, to thereby generate a feedback voltage Vfb used when the power factor correction IC 28a switches the NMOS transistor 29. Note that the feedback voltage Vfb generated at the node at which the resistors 33, 34 are coupled is applied to the terminal FB of the power factor correction IC 28a.

The resistor 35 and the capacitors 36, 37 are elements for phase compensation of the power factor correction IC 28a. The resistor 35 and the capacitor 36 are provided in series between the terminal COMP and the ground, and the capacitor 37 is provided in parallel with the resistor 35 and the capacitor 36.

The main coil L1 corresponds to an "inductor". Further, the terminal VH corresponds to a "first terminal", the voltage Vh applied to the terminal VH corresponds to a "voltage corresponding to an AC voltage". The capacitor 32 coupled to the terminal VH corresponds to a "first capacitor". Further, the NMOS transistor 29 corresponds to a "transistor".

In addition, the terminal COMP corresponds to a "second terminal", and the capacitor 36 or 37 coupled to the terminal COMP corresponds to a "second capacitor".

==Power Factor Correction IC 28a==

Figure 2:
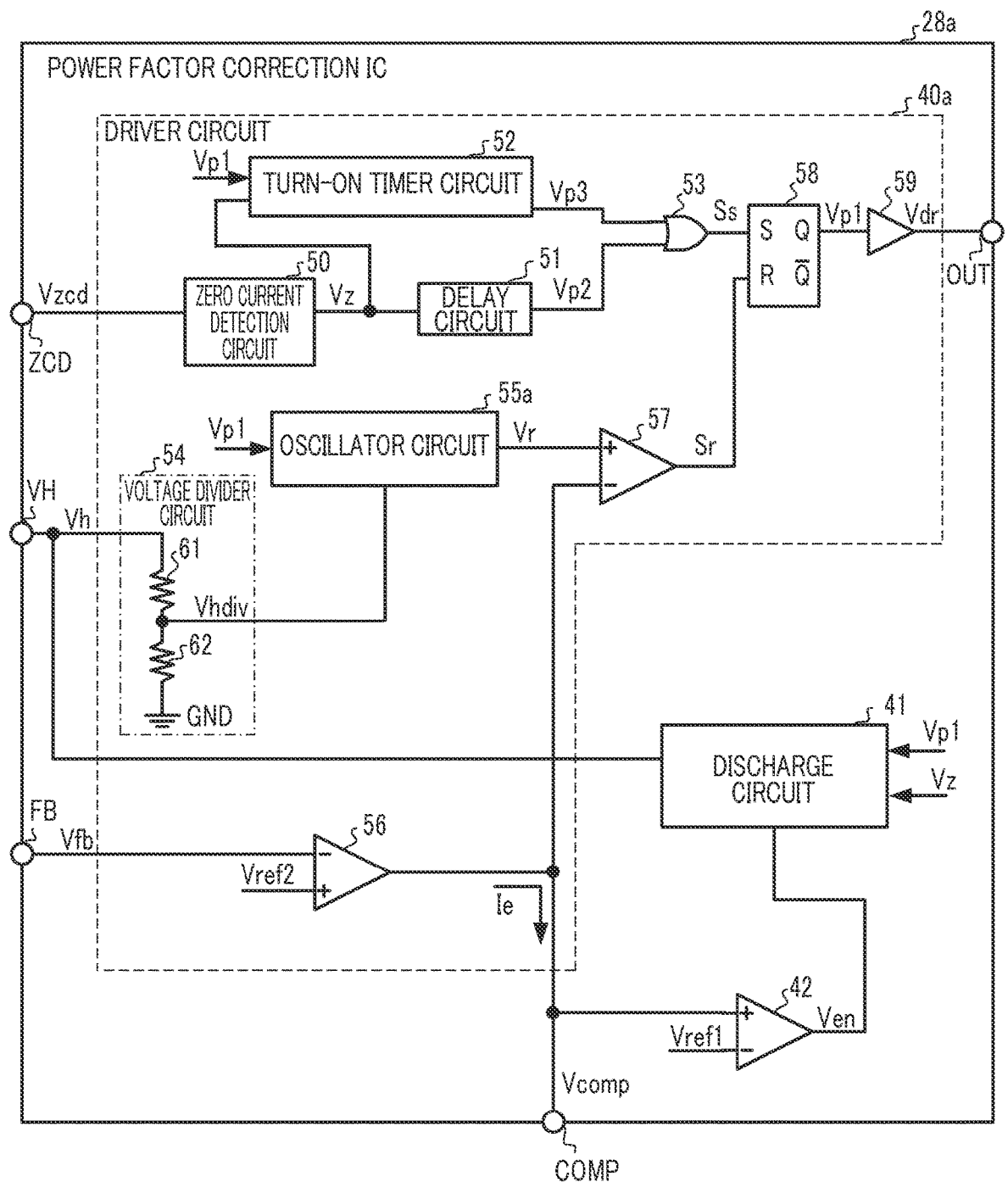

FIG. 2 illustrates an example of a configuration of the power factor correction IC 28a. The power factor correction IC 28a includes a driver circuit 40a, a discharge circuit 41, and a load determination circuit 42. Note that FIG. 2 illustrates the terminals at positions different from the positions thereof in FIG. 1 for convenience, however, wiring, element(s), and/or the like coupled to each terminal is/are the same between FIG. 1 and FIG. 2.

The driver circuit 40a outputs the signal Vdr, to thereby drive the NMOS transistor 29. The driver circuit 40a turns on the NMOS transistor 29 in response to the inductor current IL reaching substantially zero, and turns off the NMOS transistor 29 in response to an oscillating voltage Vr reaching a voltage Vcomp, which will be described later.

The discharge circuit 41 discharges the capacitor 32 coupled to the terminal VH while the driver circuit 40a causes the NMOS transistor 29 to be off.

The load determination circuit 42 determines whether the load 12 is in a light load state ("a first load state"), based on a reference voltage Vref1 and the voltage Vcomp, which will be described later. Specifically, the load determination circuit 42 determines that the load 12 is not in the light load state, in response to the voltage Vcomp being higher than the reference voltage Vref1, and determines that the load 12 is in the light load state, in response to the voltage Vcomp being lower than the reference voltage Vref1. Note that the load determination circuit 42 is a comparator to compare the voltage Vcomp applied to the terminal COMP and the reference voltage Vref1, to output a signal Ven corresponding to a result of the comparison.

Further, the phrase that the load 12 "is in the light load state" indicates, for example, that the current flowing through the load 12 is a predetermined value (e.g., 100 mA) or smaller. Furthermore, the phrase that the load 12 "is not in the light load state" indicates that the current flowing through the load 12 exceeds the predetermined value (e.g., 100 mA).

===Details of Driver Circuit 40a===

The driver circuit 40a includes a zero current detection circuit 50, a delay circuit 51, a turn-on timer circuit 52, an OR circuit 53, a voltage divider circuit 54, an oscillator circuit 55a, an error voltage generator circuit 56, a comparator 57, an SR flip-flop 58, and a buffer circuit 59.

The zero current detection circuit 50 detects that the current value of the inductor current IL reaches a "current value Ia", which indicates substantially zero (hereinafter, "substantially zero" may be referred to simply as zero, for convenience), based on the voltage Vzcd at the terminal ZCD. Note that the zero current detection circuit 50 according to an embodiment of the present disclosure outputs a high signal Vz upon detecting that the current value of the inductor current IL is the "current value Ia", which is substantially zero. Note that the zero current detection circuit 50 includes a comparator (not illustrated) to compare a predetermined voltage at the auxiliary coil L2 when the inductor current IL reaches "the current value Ia" and the voltage Vzcd.

Upon receiving the high signal Vz from the zero current detection circuit 50, the delay circuit 51 delays it by a predetermined time and outputs a resultant signal as a pulse signal Vp2.

The turn-on timer circuit 52 outputs a high pulse signal Vp3 in response to a high driving signal Vp1 (described later) having not been received for a predetermined turn-on period since receipt of the high signal Vz.

The OR circuit 53 outputs a high set signal Ss, in response to the high pulse signal Vp2 being received from the delay circuit 51 or the high pulse signal Vp3 being received from the turn-on timer circuit 52.

The voltage divider circuit 54 generates a voltage Vhdiv obtained by dividing the voltage Vh that is obtained by full-wave rectification of the input voltage Vin. The voltage divider circuit 54 includes resistors 61, 62. The resistor 61 has one end coupled to the terminal VH, and the other end coupled to one end of the resistor 62. Further, the other end of the resistor 62 is grounded. As a result, the voltage Vhdiv is generated at the node at which the resistors 61, 62 are coupled. The resistance value of the resistor 61 is, for example, 100 MΩ, and the resistance value of the resistor 62 is 1 MΩ. The resistor 61 corresponds to a "first resistor", and the resistor 62 corresponds to a "second resistor".

In response to the inductor current IL becoming smaller than the current value Ia and the high driving signal Vp1 being received, the oscillator circuit 55a outputs the oscillating voltage Vr whose amplitude gradually increases with a predetermined slope, based on the voltage Vh. The oscillator circuit 55a is coupled to the node between the resistors 61, 62.

The error voltage generator circuit 56 is a transconductance amplifier to generate an error current Ie according to an error between the feedback voltage Vfb and a reference voltage Vref2 corresponding to the output voltage Vout of a target level. The error voltage generator circuit 56 according to an embodiment of the present disclosure charges the capacitors 36, 37 with the error current Ie. As a result, the voltage Vcomp is generated at the terminal COMP.

The comparator 57 is a circuit to compare the oscillating voltage Vr and the voltage Vcomp corresponding to the feedback voltage Vfb. Specifically, the voltage Vcomp is applied to the inverting input terminal of the comparator 57, and the oscillating voltage Vr is applied to the non-inverting input terminal of the comparator 57. Thus, the comparator 57 outputs a low reset signal Sr in response to the level of the oscillating voltage Vr being lower than the level of the voltage Vcomp, and outputs a high reset signal Sr in response to the level of the oscillating voltage Vr being higher than the level of the voltage Vcomp.

The SR flip-flop 58 outputs the high driving signal Vp1 upon receiving the high set signal Ss from the OR circuit 53. Meanwhile, the SR flip-flop 58 outputs a low driving signal Vp1 upon receiving the high reset signal Sr from the comparator 57.

The buffer circuit 59 drives the NMOS transistor 29 in response to the driving signal Vp1. Specifically, the buffer circuit 59 turns on the NMOS transistor 29 in response to the high driving signal Vp1, and turns off the NMOS transistor 29 in response to the low driving signal Vp1.

Note that, with respect to the inductor current IL, the current value Ia corresponds to a "predetermined value". Further, the voltage Vcomp applied to the terminal COMP corresponds to an "error voltage". Further, the t load determination circuit 42 corresponds to a "determination circuit". Furthermore, the SR flip-flop 58 corresponds to a "driving signal output circuit".

===Oscillator Circuit 55a===

Figure 3:
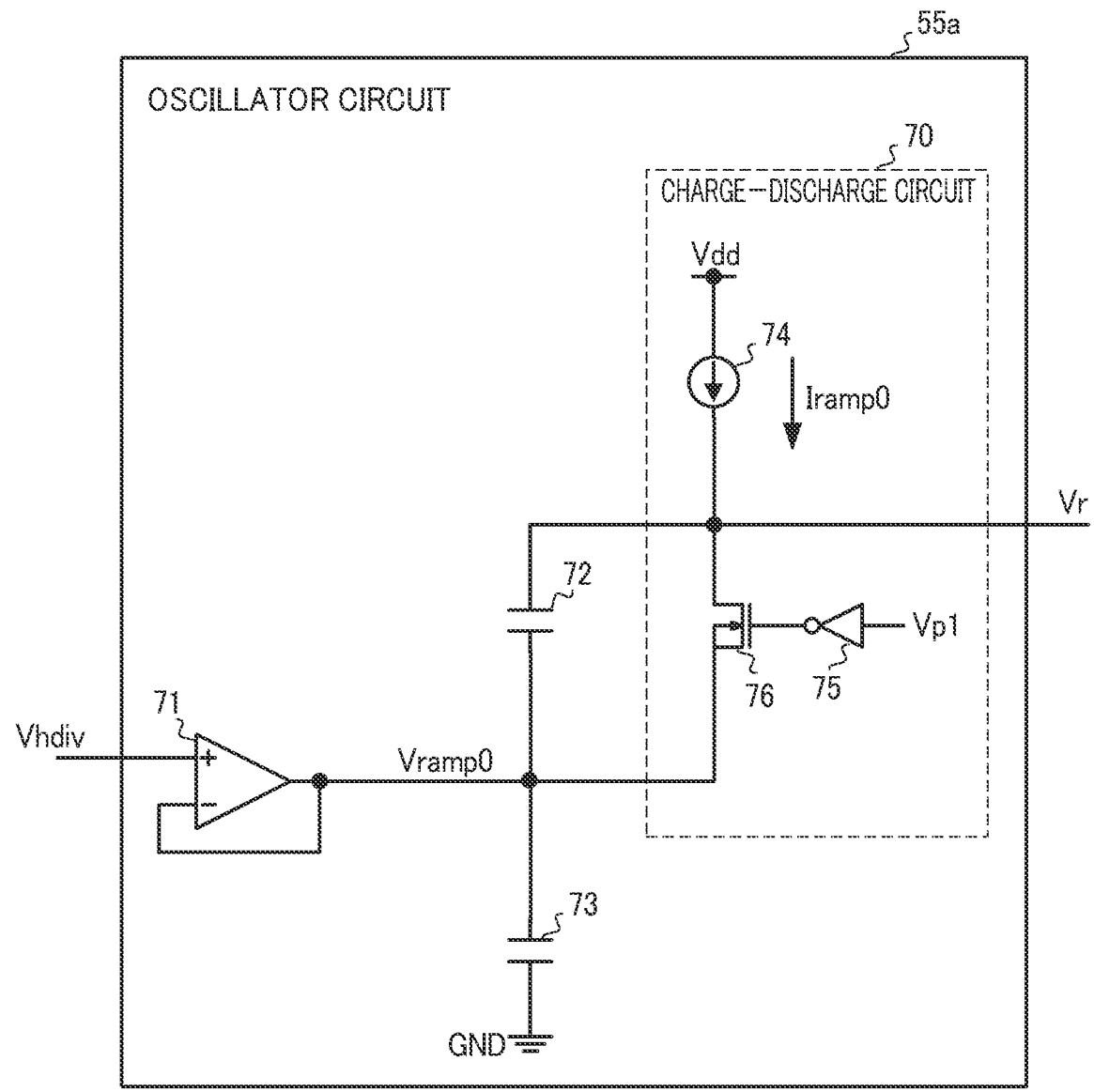

FIG. 3 illustrates an example of a configuration of the oscillator circuit 55a. The oscillator circuit 55a includes a charge-discharge circuit 70, a buffer circuit 71, and capacitors 72, 73.

The charge-discharge circuit 70 charges and discharges the capacitor 72, to thereby generate the oscillating voltage Vr with a predetermined slope, and includes a constant current source 74 that outputs a constant current Iramp0, an inverter 75, and an NMOS transistor 76.

The buffer circuit 71 outputs a bias voltage Vramp0 to the capacitor 72, based on the divided voltage Vhdiv. Note that the buffer circuit 71 operates as a so-called voltage follower.

The NMOS transistor 76 is turned off, in response to the inductor current IL reaching substantially zero and the high driving signal Vp1 being inputted to the inverter 75. Upon turning off of the NMOS transistor 76, the capacitor 72 is charged with the current Iramp0 from the constant current source 74. Meanwhile, the capacitor 73 is charged so as to hold the bias voltage Vramp0 from the buffer circuit 71.

Accordingly, the oscillating voltage Vr results in a voltage obtained by adding the voltage at the capacitor 72 to the voltage at the capacitor 73 (i.e., the bias voltage Vramp0). Thus, in response to the high driving signal Vp1 being inputted to the charge-discharge circuit 70, the oscillating voltage Vr gradually rises with a predetermined slope from the bias voltage Vramp0.

Meanwhile, the NMOS transistor 76 is turned on, in response to the low driving signal Vp1 being inputted to the inverter 75. Upon turning on of the NMOS transistor 76, the capacitor 72 is discharged. In this case, the charge stored in the capacitor 72 is drawn to the ground through a transistor (not illustrated) in the output stage of the buffer circuit 71, the NMOS transistor 76, and the like. With the capacitor 72 being discharged, the oscillating voltage Vr results in the bias voltage Vramp0.

Note that the charge-discharge circuit 70 uses the NMOS transistor 76 as a device to charge and discharge the capacitor 72, however, a switching device such as a PMOS transistor, a bipolar transistor, or the like may be used instead thereof.

===Discharge Circuit 41===

Figure 4:
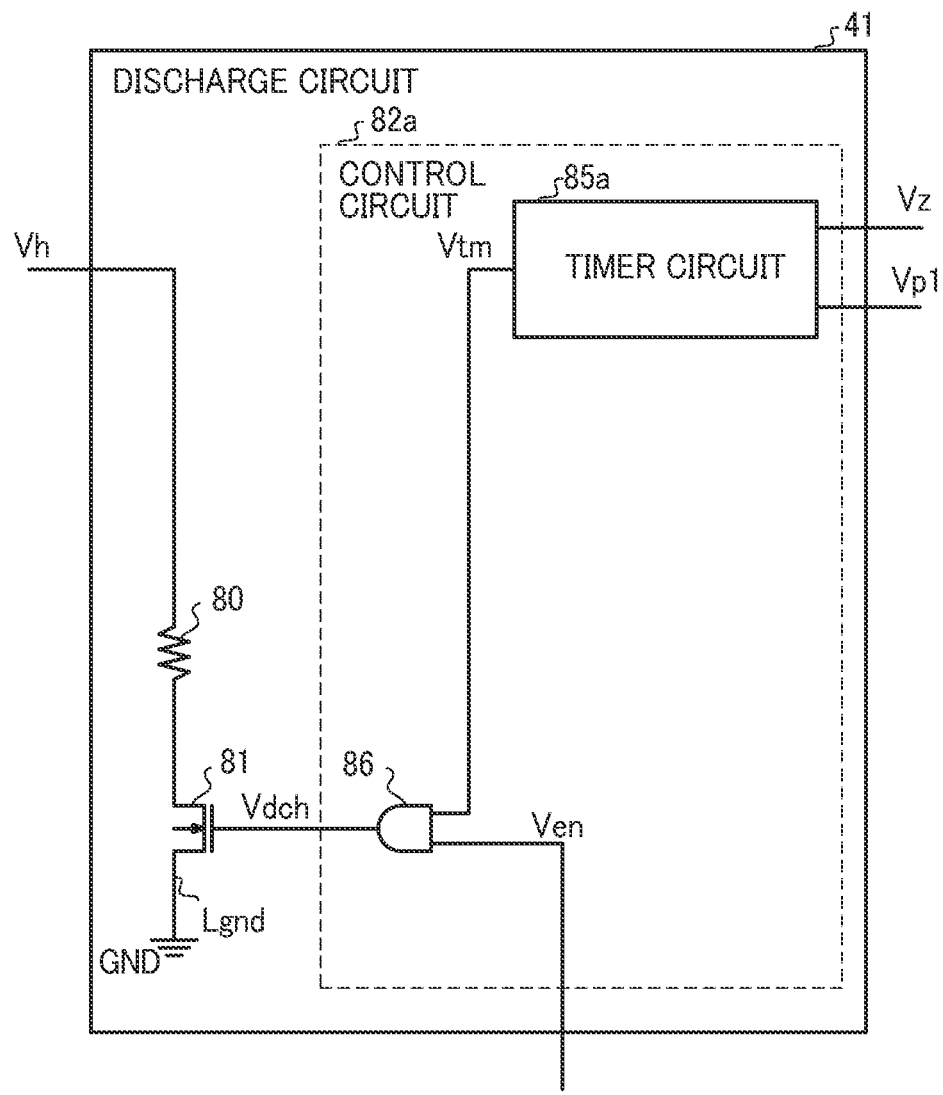
FIG. 4 illustrates an example of a configuration of a discharge circuit 41.

FIG. 4 illustrates an example of a configuration of the discharge circuit 41 of FIG. 2. The discharge circuit 41 discharges the capacitor 32 in a time period from a timing at which the NMOS transistor 29 is turned off to a timing at which the NMOS transistor 29 is turned on, when the load 12 is not in the light load state. Further, the discharge circuit 41 stops discharging the capacitor 32, when the load 12 is in the light load state. The discharge circuit 41 includes a resistor 80, an NMOS transistor 81, and a control circuit 82a.

The resistor 80 is an element to adjust the value of the drain-source current of the NMOS transistor 81 (i.e., discharge current of the capacitor 32), and has one end coupled to the terminal VH. The resistor 80 has a resistance value smaller than the resistance value of each of the resistors 61, 62 of the voltage divider circuit 54 in FIG. 2. For example, when the resistor 61 has a resistance value of 100 MΩ, and the resistor 62 has a resistance value of 1 MΩ, the resistor 80 has a resistance value of 100 kΩ. Accordingly, the charge of the capacitor 32 can be reliably drawn in a time period during which the NMOS transistor 29 is off.

The NMOS transistor 81 functions as a switch to draw the charge stored in the capacitor 32 coupled to the terminal VH, to the ground. The NMOS transistor 81 discharges the capacitor 32 in response to a voltage Vdch applied to the gate electrode thereof being high, and stop discharging the capacitor 32 in response to the voltage Vdch being low.

Note that the NMOS transistor 81 has a drain electrode to which the other end of the resistor 80 is coupled, and a source electrode to which a ground line Lgnd resulting in a ground potential is coupled. That is, the NMOS transistor 81 is provided between the resistor 80 and the ground line Lgnd.

===Control Circuit 82a===

The control circuit 82a in FIG. 4 controls on and off of the NMOS transistor 81 such that the capacitor 32 is discharged in a predetermined time period Ta (e.g., 3 microseconds shorter than 10 microseconds which is a common off-period), upon turning off of the NMOS transistor 29, when the load 12 is not in the light load state. Note that the control circuit 82a stops discharging the capacitor 32, when the load 12 is in the light load state.

Specifically, when the signal Ven is high (it is indicated that the load 12 is not in the light load state), the control circuit 82a causes the NMOS transistor 81 to be on for the predetermined time period Ta from when the low driving signal Vp1 is received. Note that the control circuit 82a turns off the NMOS transistor 81 even before the lapse of the time period Ta, if receiving the high pulsed signal Vz. Further, the control circuit 82a causes the NMOS transistor 81 to be off when the signal Ven is low (it is indicated that the load 12 is in the light load state). Here, the control circuit 82a includes a timer circuit 85a and an AND circuit 86.

The timer circuit 85a measures the time period Ta from a timing at which the NMOS transistor 29 in FIG. 1 is turned off, in response to the low driving signal Vp1. The timer circuit 85a outputs a high signal Vtm during the time period Ta, and outputs a low signal Vtm during a time period other than the above time period.

Further, the signal Vz is inputted to the timer circuit 85a. A timer circuit 85 according to an embodiment of the present disclosure is designed so as to output the low signal Vtm upon receiving the high pulsed signal Vz, which indicates that the inductor current IL reaches zero, regardless of whether the time period Ta has elapsed.

Thus, the timer circuit 85a can prevent the capacitor 32 from being discharged after turning on of the NMOS transistor 29. This can prevent the operation of the discharge circuit 41 from affecting the operation of the power factor correction IC 28a when the NMOS transistor 29 is on.

Note that the timer circuit 85a may be designed so as to output the low signal Vtm when the driving signal Vp1 changes to high to turn on the NMOS transistor 29 before the time period Ta has elapsed. In other words, the timer circuit 85a may output the low signal Vtm in response to the high driving signal Vp1.

The AND circuit 86 causes the NMOS transistor 81 to be on during the time period Ta from turning off of the NMOS transistor 29 when the load 12 is not in the light load state, and causes the NMOS transistor 81 to be off during a time period other than the above time period. Specifically, the AND circuit 86 calculates the logical sum of the signal Ven and the signal Vtm, and outputs a high signal Vdch in a case where both the signal Ven and the signal Vtm are high. The AND circuit 86 outputs a low signal Vdch in cases other than the above case.

The resistor 80 corresponds to a "third resistor", and the NMOS transistor 81 corresponds to a "switch". The time period Ta corresponds to a "predetermined time period".

===Operation Waveforms of Discharge Circuit 41===

Figure 5:
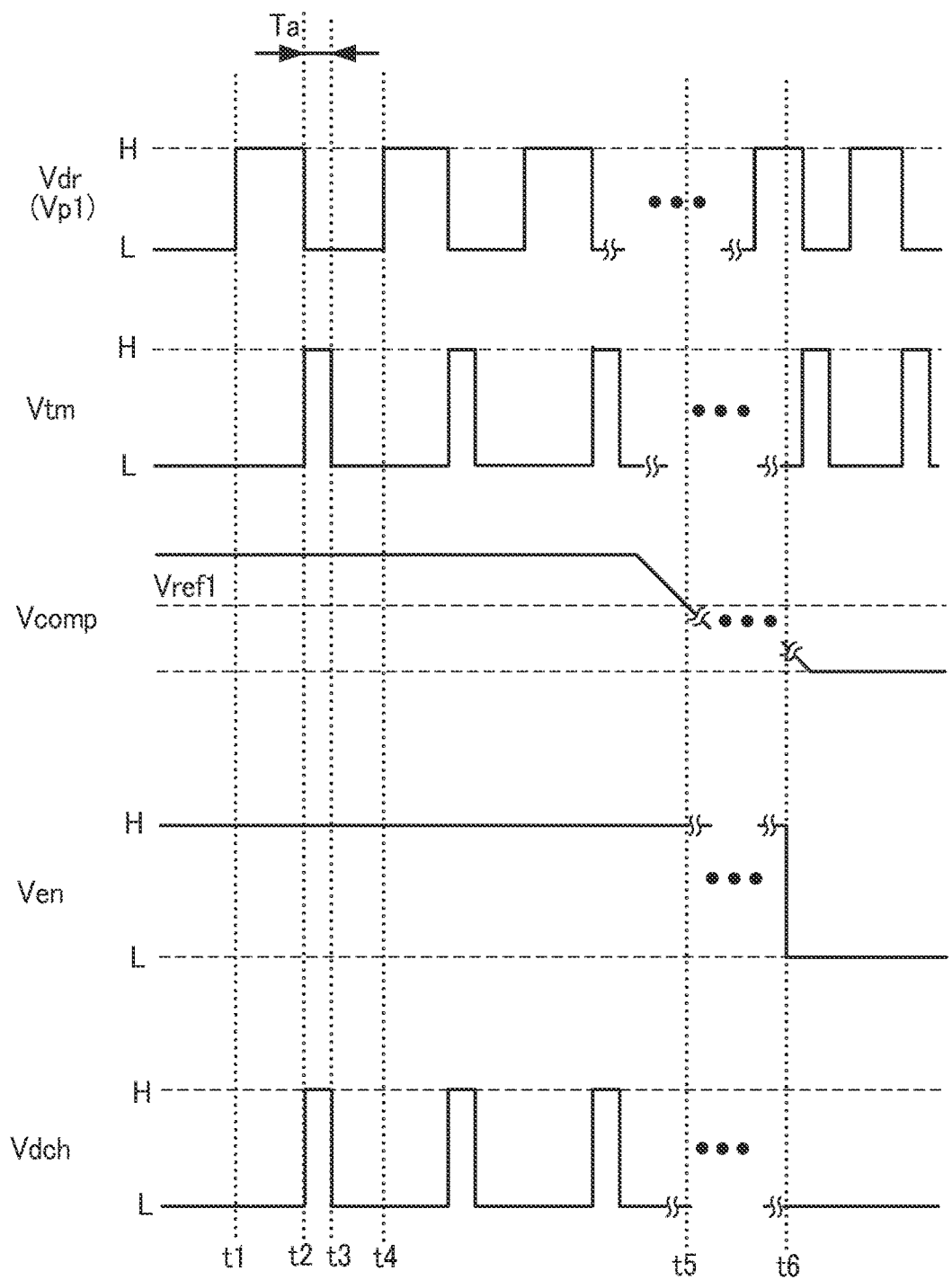
FIG. 5 illustrates an example of the operation waveforms of a discharge circuit 41.

FIG. 5 illustrates an example of the operation waveforms of the discharge circuit 41. FIG. 5 illustrates the waveforms of main signals in the discharge circuit 41. Note that the drawing illustrates from the state in which the current flowing through the load 12 is large and the voltage Vcomp is higher than the reference voltage Vref1, in the initial time.

At time t1, the buffer circuit 59 in FIG. 2 changes the signal Vdr, which is to be outputted to the gate electrode of the NMOS transistor 29, to high.

At time t2, in response to the oscillating voltage Vr outputted from the oscillator circuit 55a reaching the voltage Vcomp from the error voltage generator circuit 56, the comparator 57 outputs a signal Sr to turn off the NMOS transistor 29. This causes the buffer circuit 59 to change the level of the signal Vdr to be outputted therefrom to low.

The timer circuit 85a changes the level of the signal Vtm to be outputted therefrom to high from the timing at which the NMOS transistor 29 is turned off. The discharge circuit 41 changes the voltage Vdch to be applied to the gate electrode of the NMOS transistor 81 to high from the timing at which the NMOS transistor 29 is turned off, to thereby start discharging the capacitor 32.

At time t3, the time period Ta has elapsed since the discharge circuit 41 starts discharging the capacitor 32. In response thereto, the timer circuit 85a changes the level of the signal Vtm to be outputted therefrom to low, and the discharge circuit 41 changes the voltage Vdch to be applied to the gate electrode of the NMOS transistor 81 to low, to thereby stop discharging the capacitor 32.

After time t3, in response to a predetermined delay time having elapsed at time t4 since the inductor current IL reaches zero, the buffer circuit 59 turns on the NMOS transistor 29. Thereafter, the operation from time t1 to the time when the NMOS transistor 29 is turned on again is repeated.

Here, when the load 12 gradually becoming the light load state, the current flowing through the load decreases and the output voltage Vout rises. As a result, the error current Ie outputted by the error voltage generator circuit 56 decreases, so that the voltage Vcomp at the terminal COMP drops. At time t5, the voltage Vcomp applied to the terminal COMP reaches the reference voltage Vref1.

At time t6, the load determination circuit 42 outputs the low signal Ven indicating that the load 12 is in the light load state, in response to the voltage Vcomp dropping below the reference voltage Vref1. Thereafter, irrespective of the level of the signal Vtm, the AND circuit 86 outputs a low signal. Accordingly, the discharge circuit 41 does not perform the discharging operation until the signal Ven goes high again.

As such, when the load 12 is in the light load state, the discharge circuit 41 stops the operation of discharging the capacitor 32. This can reduce the power consumption of the AC-DC converter 11a when the load 12 is in the light load state. Accordingly, the discharge circuit 41 according to an embodiment of the present disclosure achieves reduction in power consumption depending on the load state.

===Operation Waveforms of AC-DC Converter 11a===

Figure 6:
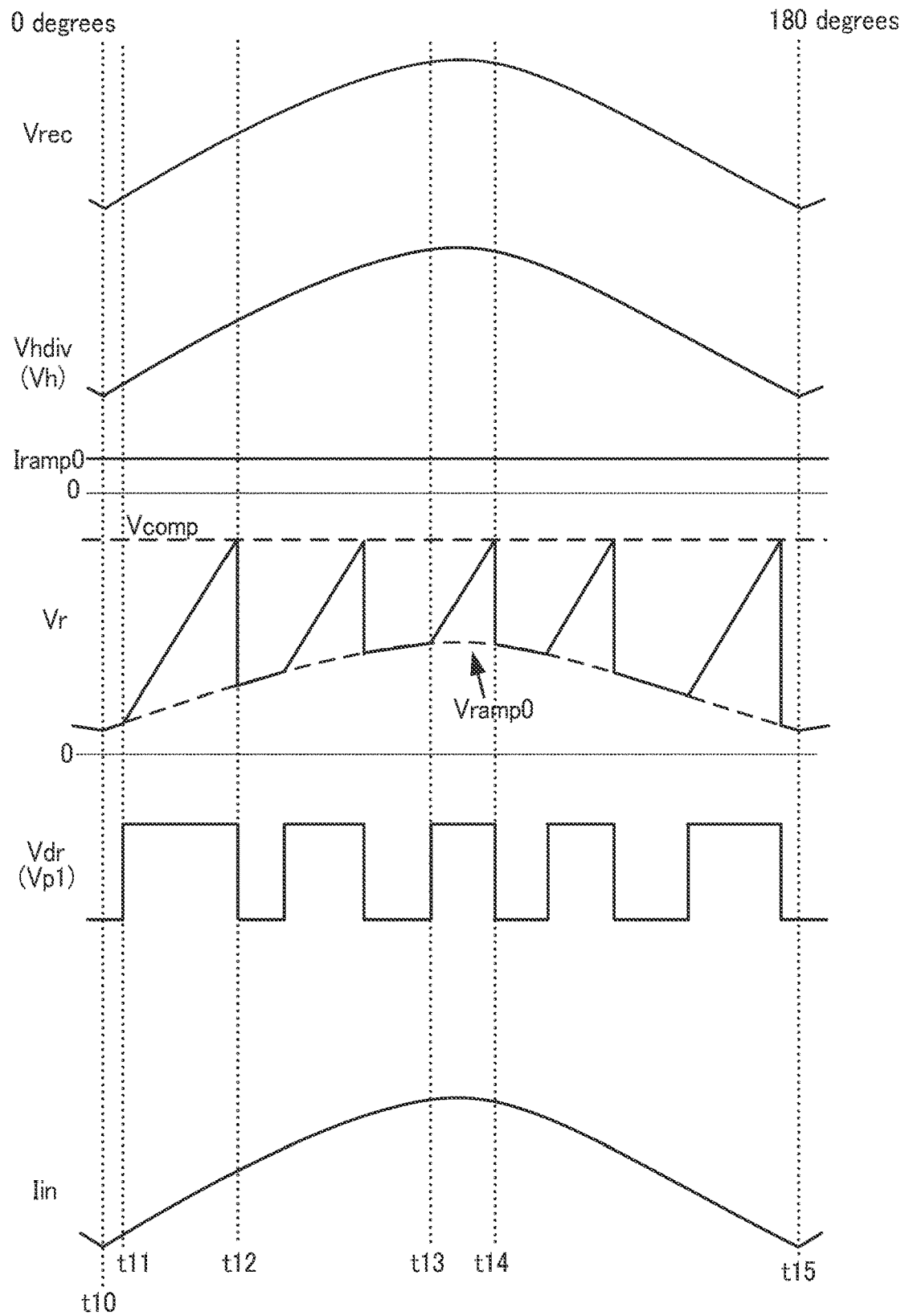
FIG. 6 illustrates an example of the main waveforms of voltages and currents in an AC-DC converter 11a using a power factor correction IC 28a that includes a discharge circuit 41.

FIG. 6 illustrates an example of the main waveforms of voltages and currents in the AC-DC converter 11a using the power factor correction IC 28a that includes the discharge circuit 41.

At time t10, the phase angle of the voltage Vh obtained by full-wave rectification of the AC voltage Vac is 0 degrees, and the level of the divided voltage Vhdiv obtained by dividing the voltage Vh is the lowest. Then, the buffer circuit 71 in FIG. 3 outputs the divided voltage Vhdiv as the bias voltage Vramp0. Thus, the bias voltage Vramp0 starts rising with a rise in the divided voltage Vhdiv.

At time t11, in response to the inductor current IL decreases below substantially zero, the delay circuit 51 in FIG. 2 outputs the high pulse signal Vp2. Then, the SR flip-flop 58 outputs the high driving signal Vp1, and as a result, the power factor correction IC 28a turns on the NMOS transistor 29. Note that the bias voltage Vramp0 becomes higher than that at time t10.

Upon turning on of the NMOS transistor 29, the charge-discharge circuit 70 starts charging the capacitor 72 with the constant current Iramp0. Then, the oscillating voltage Vr results in a voltage obtained by adding the bias voltage Vramp0 outputted by the buffer circuit 71 and the voltage at the capacitor 73. In this event, the capacitor 72 is charged with the constant current Iramp0, so that the oscillating voltage Vr gradually rises with a predetermined slope.

At time t12, in response to the oscillating voltage Vr reaching the voltage Vcomp, the comparator 57 outputs the high reset signal Sr. This causes the SR flip-flop 58 to output the low driving signal Vp1, which results in the power factor correction IC 28a turning off the NMOS transistor 29.

In response to turning off of the NMOS transistor 29, the charge-discharge circuit 70 discharges the capacitor 72, and the oscillating voltage Vr reaches the bias voltage Vramp0. Then, in a time period from time t12 to time t13, the power factor correction IC 28a repeats driving of the NMOS transistor 29, similarly.

Note that, in response to turning off of the NMOS transistor 29, the discharge circuit 41 discharges the capacitor 32 during the time period Ta. This causes the rectified voltage Vrec (and the input voltage Vin) to have a low phase angle, and when the absolute value of the rectified voltage Vrec is small, the voltage Vh applied to the terminal VH to which the capacitor 32 is coupled becomes low voltage having waveform similar to that of the rectified voltage Vrec. Note that, when no charge is drawn from the capacitor 32, the voltage Vh may not drop even if the rectified voltage Vrec has a low phase angle. Details thereof will be described with reference to FIG. 8

Further, from time t12 to time t13, the bias voltage Vramp0 rises with a rise in the divided voltage Vhdiv. This means a rise in the starting point (offset voltage from 0 V) of the oscillating voltage Vr rising after turning on of the NMOS transistor 29. Accordingly, the oscillating voltage Vr outputted by the oscillator circuit 55a rises, and the time taken for the oscillating voltage Vr to reach the voltage Vcomp gradually decreases, and in association therewith, the on period of the NMOS transistor 29 gradually decreases.

At time t13, the power factor correction IC 28a turns on the NMOS transistor 29, and at time t14, the power factor correction IC 28a turns off the NMOS transistor 29. Note that the on period of the NMOS transistor 29 from time t13 to time t14 is shorter than the on period of the NMOS transistor 29 from time t11 to time t12. This is because, in the time period from time t13 to time t14, the voltage level of the bias voltage Vramp0 (i.e., the divided voltage Vhdiv), which changes according to the level of the voltage Vh is higher than the voltage level thereof in the time period from time t11 to time t12.

Accordingly, the power factor correction IC 28a controls the NMOS transistor 29 such that the higher the level of the voltage Vh, the shorter the on period of the NMOS transistor 29, and the lower the level of the voltage Vh, the longer the on period of the NMOS transistor 29, in other words, the on period of the NMOS transistor 29 inversely correlating to the level of the voltage Vh. From time t14 to time t15, the power factor correction IC 28a repeats driving of the NMOS transistor 29, similarly. Further, from time t14 to time t15, the bias voltage Vramp0 drops according to a drop in the divided voltage Vhdiv. Thus, from time t14, the on period of the NMOS transistor 29 gradually increases.

At time t15, the phase angle of the voltage Vh obtained by full-wave rectification of the AC voltage Vac is 180 degrees, and the level of the divided voltage Vhdiv obtained by dividing the voltage Vh is the lowest.

As described above, the power factor correction IC 28a increases the on period of the NMOS transistor 29 in the vicinity of the absolute value of the AC voltage Vac being small, thereby allowing the large amount of the inductor current IL to flow in a region where the AC voltage Vac has a low phase angle. Accordingly, the power factor correction IC 28a can suppress the occurrence of a "dead angle", which is a phenomenon in which the input current Iin stops flowing in the vicinity of the absolute value of the AC voltage Vac being small.

In addition, the buffer circuit 71 can change the on period of the NMOS transistor 29 by changing the bias voltage Vramp0, irrespective of the effect of the noise component of the voltage Vcomp caused by the switching noise of the NMOS transistor 29 and the like.

Note that the input current Iin and the AC voltage Vac having a "high phase angle" indicates that the angle is, for example, in a range of 90±10+180 n degrees, in other words, in a range of (80–100)+180 n degrees, where n is an integer. Meanwhile, the input current Iin and the AC voltage Vac having a "low phase angle" indicates that the angle is, for example, in a range of 0±10+180 n degrees, in other words, in a range of (−10–+10)+180 n degrees, where n is an integer.

Further, in the power factor correction IC 28a according to an embodiment of the present disclosure, the discharge circuit 41 is provided, and thus the charge stored in the capacitor 32 is discharged in the time period during which the NMOS transistor 29 is off. With the capacitor 32 being discharged by the discharge circuit 41, the waveform of the voltage Vh results in being similar to the waveform of the rectified voltage Vrec according to the phase angle. Accordingly, the power factor correction IC 28a can suppress the occurrence of the dead angle when the rectified voltage Vrec (and the input voltage Vin) is (are) in low phase, thereby being able to improve the power factor and total harmonic distortion (THD).

Note that FIG. 6 illustrates a few pulses of the driving signal Vp1 to facilitate understanding of the power factor correction IC 28a according to an embodiment of FIG. 2. However, the switching frequency of the NMOS transistor 29 is, for example, several kHz, and is sufficiently higher than 50 to 60 Hz, which is the frequency of the AC voltage Vac. Thus, in actuality, the time period corresponding to one period of the AC voltage Vac includes a large number of the driving signals Vp1.

The timing (time t12, t14, etc.) at which the power factor correction IC 28a turns off the NMOS transistor 29 corresponds to a "first timing", and the timing (time t11, t13, etc.) at which the power factor correction IC 28a turns on the NMOS transistor 29 corresponds to a "second timing".

=Effect of Operation of Discharge Circuit 41 on Voltage Vh===

Figure 7:
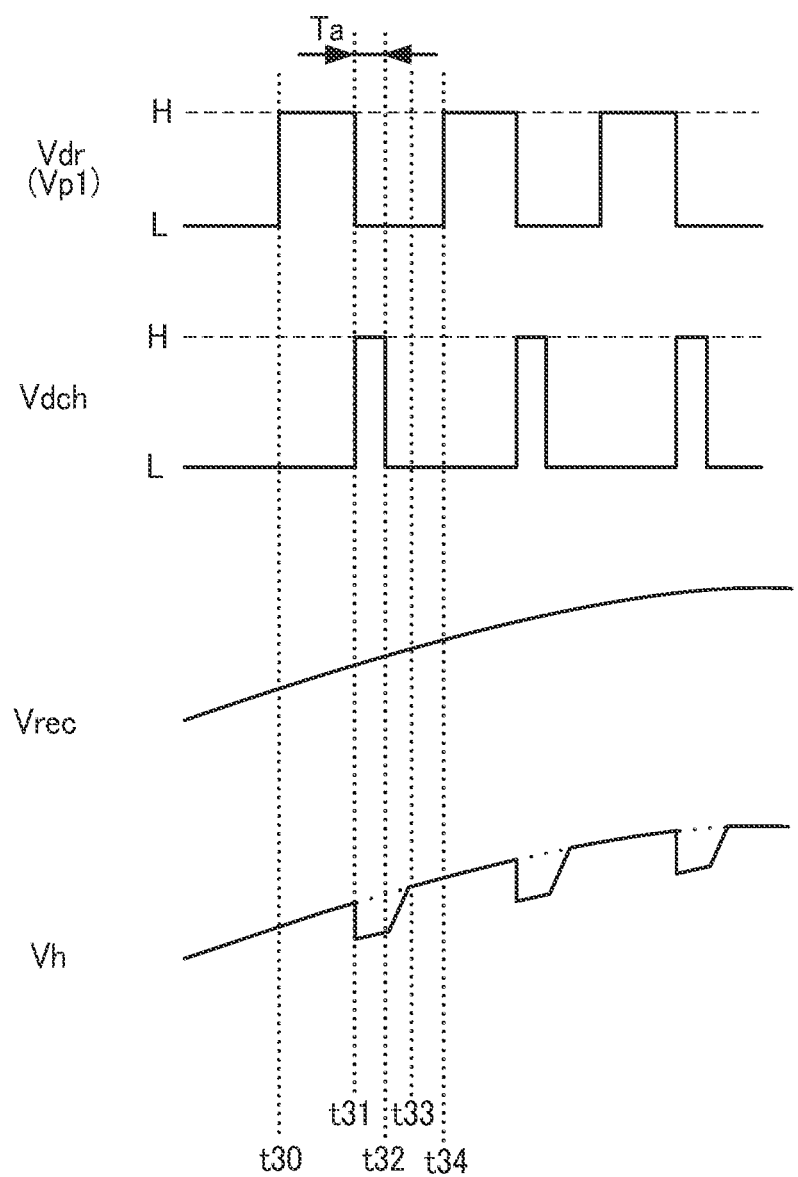
FIG. 7 illustrates an example of the waveforms for explaining the effect of the operation of a discharge circuit 41 on a voltage Vh.

FIG. 7 illustrates an example of the waveforms to explain the effect of the operation of the discharge circuit 41 on the voltage Vh. The following describes the NMOS transistor 29, focusing on a specific switching period (from time t31 to time t34). Note that the voltage Vh changes similarly, in other switching periods of the NMOS transistor 29.

FIG. 7 illustrates the waveforms when the load determination circuit 42 determines that the load 12 is not in the light load state, in the entire time period in the FIG. 7. Accordingly, in this time period, the discharge circuit 41 operates during the time period during which the NMOS transistor 29 is off.

From time t30 to time t31, the buffer circuit 59 of FIG. 2 outputs the high signal Vdr to the gate electrode of the NMOS transistor 29.

At time t31, the buffer circuit 59 changes the signal Vdr to low to turn off the NMOS transistor 29. From this timing, the control circuit 82a of FIG. 4 changes the signal Vdch to be outputted to the gate electrode of the NMOS transistor 81 to high.

Accordingly, the NMOS transistor 81 is turned on, and the charge stored in the capacitor 32 is drawn to the ground through the resistor 80 and the NMOS transistor 81. In this event, the voltage Vh applied to the terminal VH drops mainly according to the time constant determined by the capacitance value of the capacitor 32 and the resistance value of the resistor 80. Note here that the on-resistance value of the NMOS transistor 81 is designed so as to be sufficiently smaller than the resistance value of the resistor 80.

At time t32 at which the time period Ta has elapsed since time t31, the control circuit 82a changes the signal Vdch to low. During the time period from time t31 to time t32, the voltage Vh drops with discharging of the discharge circuit 41. At time t32, discharging of the discharge circuit 41 stops, and thus the voltage Vh rises from time t32.

The voltage Vh rises until the waveform thereof becomes similar to that of the rectified voltage Vrec at time t33. As such, the voltage Vh rises after the discharge circuit 41 stops discharging the capacitor 23, until the waveform thereof returns to the height similar to that of the waveform of the rectified voltage Vrec, before the NMOS transistor 29 is turned on.

At time t34, the buffer circuit 59 changes the signal Vdr to high to turn on the NMOS transistor 29. Thereafter, the operation similar to that from time t31 to time t34 is repeated except changes in the phase angles of the rectified voltage Vrec and the voltage Vh.

If a power factor correction IC does not include the discharge circuit 41, the voltage Vh may not have a waveform similar to the waveform of the rectified voltage Vrec due to the charge being stored in the capacitor 32. The discharge circuit 41 discharges the capacitor 32 before the NMOS transistor 29 is turned on, thereby being able to maintain the voltage Vh to be similar to that of the rectified voltage Vrec. This eliminates the dead angle, which will be described below with reference to FIG. 8.

===Waveforms without Discharge Circuit 41===

Figure 8:
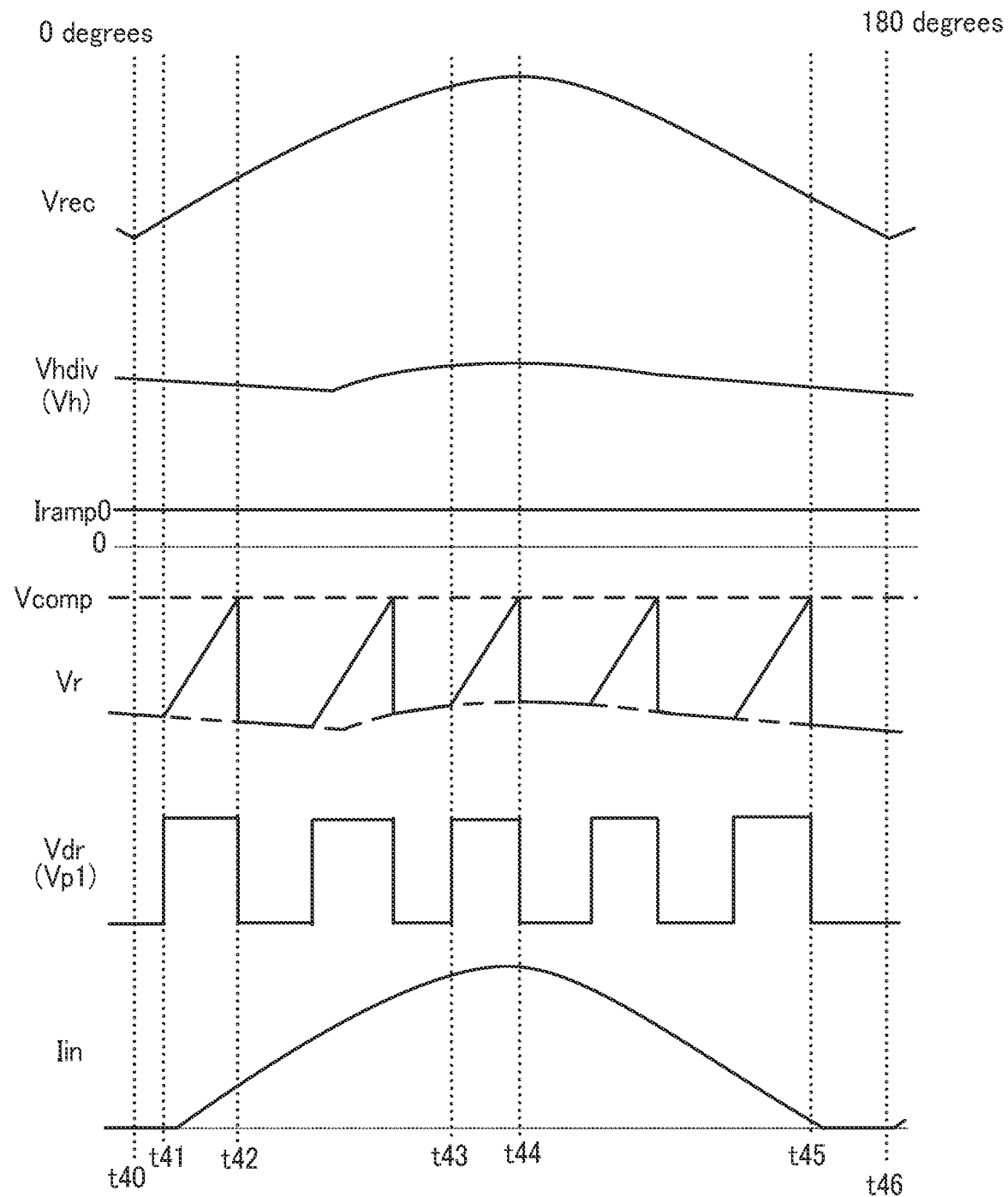
FIG. 8 illustrates an example of the main waveforms of voltages and currents in an AC-DC converter 11a using a power factor correction IC 28a without a discharge circuit 41.

FIG. 8 illustrates an example of the main waveforms of voltages and currents in the AC-DC converter 11a using the power factor correction IC 28a that does not include the discharge circuit 41.

The phase angle of the rectified voltage Vrec is zero degrees at time t40, and the phase angle of the rectified voltage Vrec is 180 degrees at time t46. Without the discharge circuit 41, even when the rectified voltage Vrec is in the range of a low phase angle such as the above, the charge may remain in the capacitor 32 coupled to the terminal VH. Accordingly, the voltage Vh applied to the terminal VH does not decreases even in the range in which the rectified voltage Vrec is in a low phase angle, resulting in the voltage Vh having a direct-current-like (DC-like) waveform.

In FIG. 8, the operations from time t41 to t45 of the circuits in the power factor correction IC without the discharge circuit 41 is the same as the operations of the circuit from time t11 to t15. However, the voltage Vh has the DC-like waveform, which reduces a difference between the time period from when the oscillating voltage Vr starts rising to when it reaches the voltage Vcomp from time t41 to time t42, and the time period from time t43 to time t44.

As such, in FIG. 8, the voltage Vh does not have a waveform similar to the waveform of the rectified voltage Vrec as in FIG. 6, and an on period during which the NMOS transistor 29 is on results in not varying according to the phase angle of the rectified voltage Vrec.

In this case, it becomes impossible to increase the on period during which the NMOS transistor 29 is on in the range in which the rectified voltage Vrec has a low phase angle. Then, in the range in which the rectified voltage Vrec has a low phase angle, the level of the rectified voltage Vrec is low, and the input current Iin is small. This results in occurrence of the dead angle, where the input current Iin is substantially zero in the range of a low phase angle.

As such, when the capacitor 32 is provided and the discharge circuit 41 is not provided, the dead angle occurs in the range in which the input current Iin has a low phase angle, and the power factor and total harmonic distortion of the power supply circuit may deteriorate.

Whereas, when the discharge circuit 41 is provided, the voltage Vh has a waveform similar to the waveform of the rectified voltage Vrec, thereby increase the on period of the NMOS transistor 29 in the range in which the rectified voltage Vrec has a low phase angle. Accordingly, in the range in which the rectified voltage Vrec has a low phase angle, the inductor current IL increases, and the charge stored in the capacitor 23 is drawn by the inductor current IL.

This causes the input current Iin to flow even when the rectified voltage Vrec has a low phase angle, which eliminates the dead angle, and improves the power factor and total harmonic distortion of the power supply circuit.

<<Modification 1>>

Figure 9:
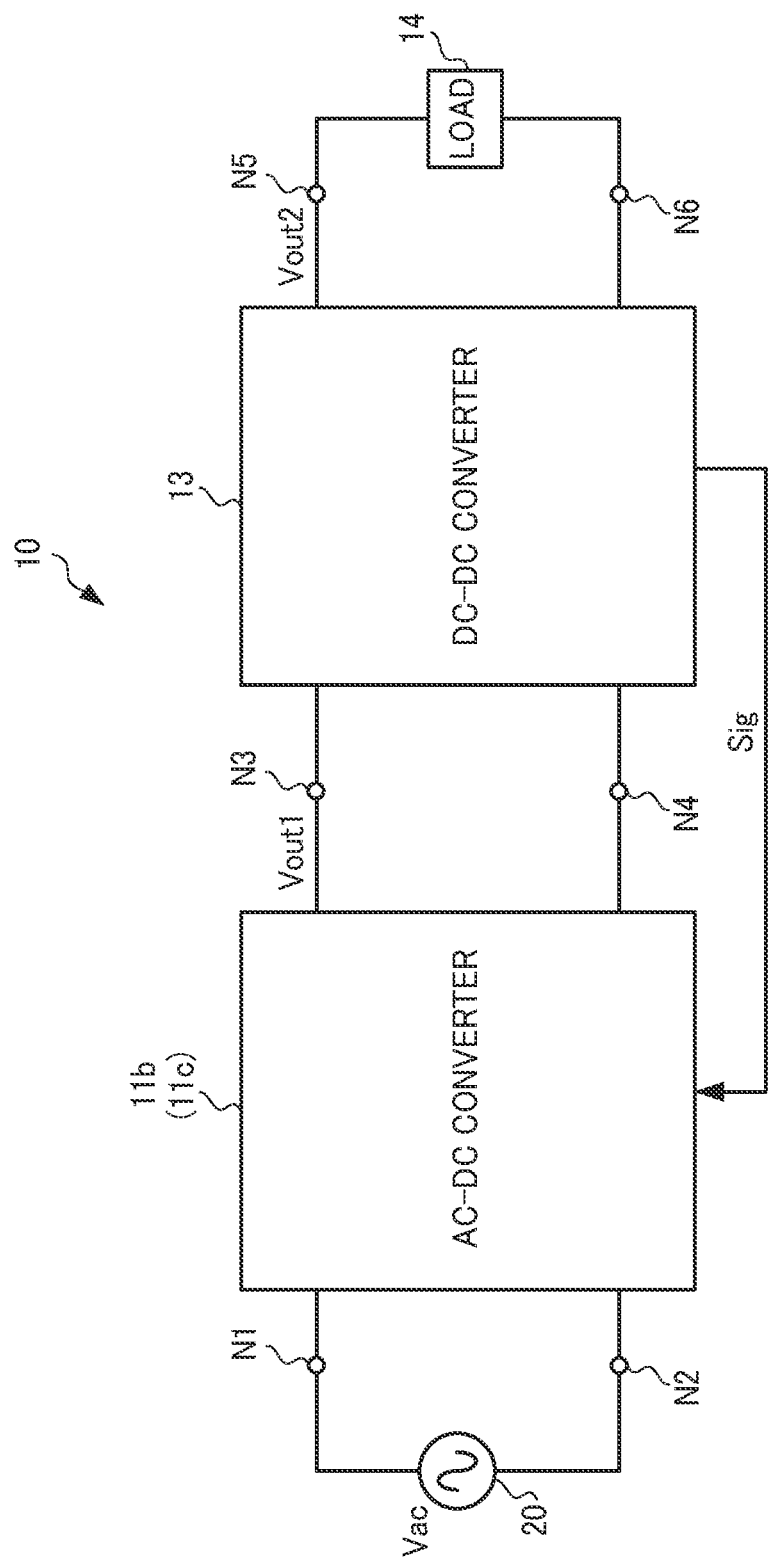
FIG. 9 illustrates an example of a configuration of a power supply device 10.

FIG. 9 illustrates an example of a configuration of a power supply device 10. The power supply device 10 includes an AC-DC converter 11b, a DC-DC converter 13, and a load 14. In the power supply device 10 according to an embodiment of the present disclosure, the AC-DC converter 11b is coupled to the load 14 through the DC-DC converter 13 that communicates with the AC-DC converter 11b.

The AC-DC converter 11b generates an output voltage Vout1 from the AC voltage Vac that is supplied by the AC power supply 20 and is applied to the nodes N1, N2.

The DC-DC converter 13 generates an output voltage Vout2 from the output voltage Vout1 applied to nodes N3, N4. The DC-DC converter 13 is an LLC current resonant converter that generates the output voltage Vout2 of a target level from the voltage Vout1, for example.

The DC-DC converter 13 detects whether the load 14 is in the light load state, based on a voltage corresponding to the power consumption of the load 14. Further, the DC-DC converter 13 outputs a signal Sig indicating the state of the load 14, based on the result of the detection. The DC-DC converter 13 outputs the signal Sig with a pulse width that is different depending on whether the state of the load 14 is in the light load state, for example.

This enables the AC-DC converter 11b to perform an operation that is different depending on the state of the load 14 in response to the signal Sig from the DC-DC converter 13, which is an external circuit outside the AC-DC converter 11b.

The load 14 is coupled to nodes N5, N6, to which the output voltage Vout2 is applied. The load 14 is an electronic device that operates with a direct-current voltage, for example.

==Configuration of AC-DC Converter 11b==

Figure 10:
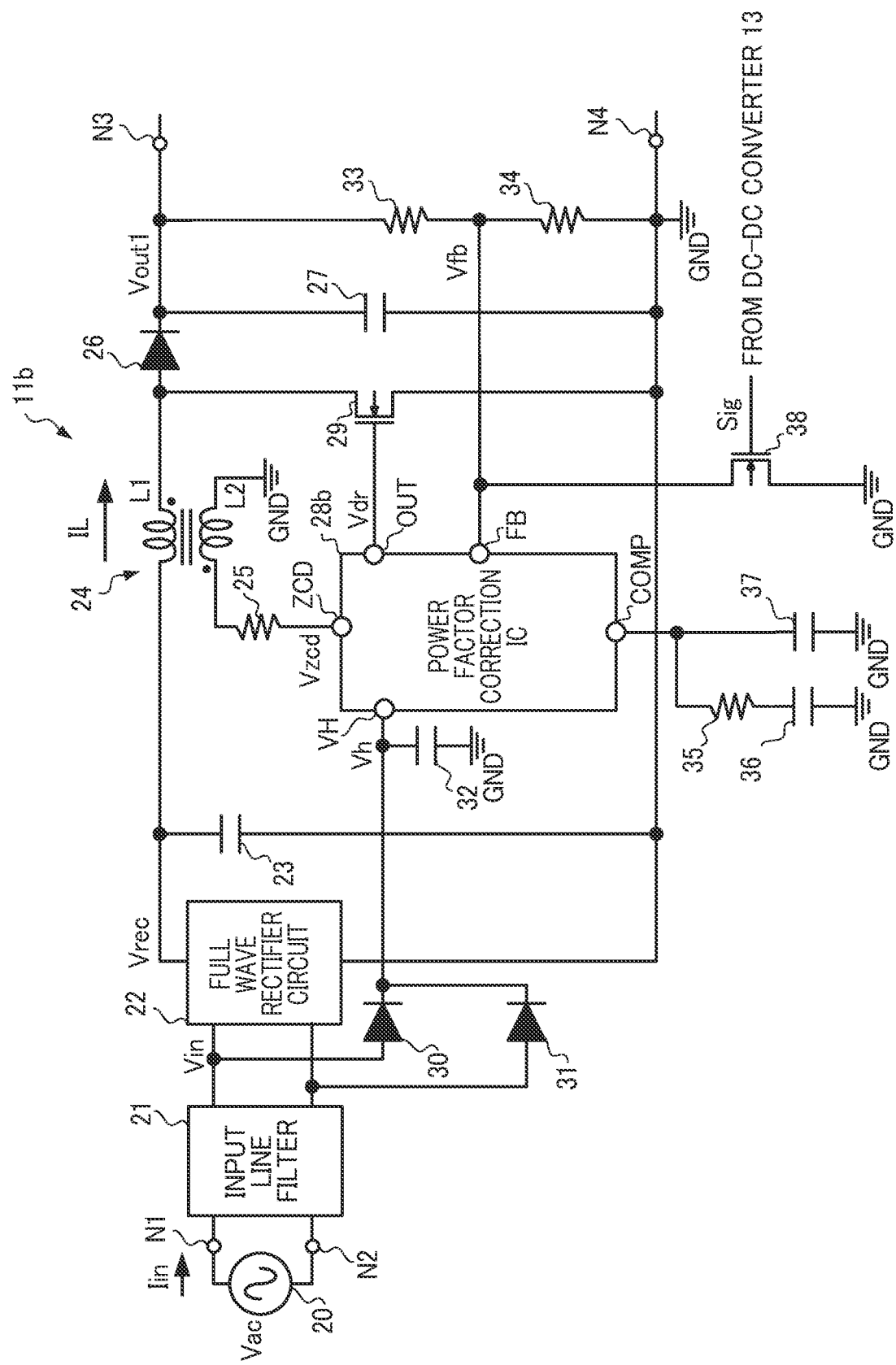
FIG. 10 illustrates an example of a configuration of an AC-DC converter 11b.

FIG. 10 illustrates an example of a configuration of the AC-DC converter 11b. The AC-DC converter 11b includes the input line filter 21, the full-wave rectifier circuit 22, the capacitors 23, 27, 32, 36, 37, the transformer 24, the resistors 25, 33 to 35, the diodes 26, 30, 31, a power factor correction IC 28b, the NMOS transistor 29, and an NMOS transistor 38.

Here, constituents in the AC-DC converter 11b that are the same as those illustrated in the AC-DC converter 11a are given the same reference numerals. The following mainly describes the AC-DC converter 11b with respect to differences from the AC-DC converter 11a.

The nodes to which the load 12 is coupled in the AC-DC converter 11a correspond to the nodes N3, N4 to which the output voltage Vout1 is applied and the DC-DC converter 13 is coupled in the AC-DC converter 11b.

The power factor correction IC 28b has, similarly to the power factor correction IC 28a, the terminals FB, COMP, OUT, VH, ZCD. Here, the terminal FB is coupled to a node at which the resistors 33, 34 are coupled, and the NMOS transistor 38 is coupled to the terminal FB.

The NMOS transistor 38 is provided between the terminal FB and the ground, to change the feedback voltage Vfb at the terminal FB to a ground voltage (corresponding to a low level of the feedback voltage Vfb) during the time period corresponding to the pulse width of the signal Sig. Based on this time period Tb (described later) for the voltage at the terminal FB to reach the ground voltage, the signal corresponding to the pulse width of the signal Sig is inputted to the terminal FB. In other words, using the feedback voltage Vfb, which is inputted to the terminal FB and goes low during the time period Tb that varies, the information on the state of the load 14 is transmitted. Note that a different switching device such as a bipolar transistor or the like may be used in place of the NMOS transistor 38. The feedback voltage Vfb, which is inputted to the terminal FB and goes low during the time period Tb that varies according to the pulse width of the signal Sig, corresponds to a "load determination signal".

==Configuration of Power Factor Correction IC 28b==

Figure 11:
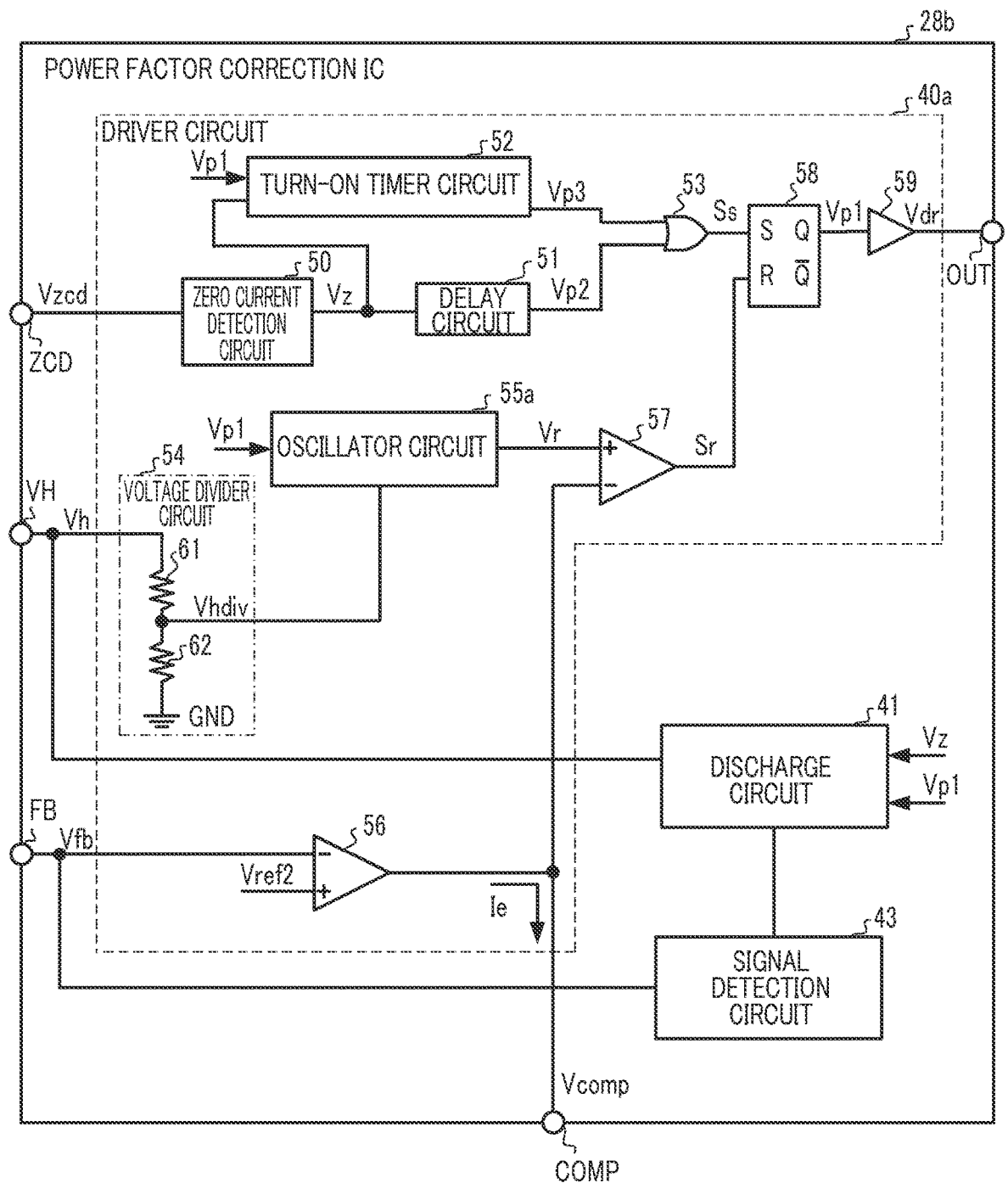
FIG. 11 illustrates an example of a configuration of a power factor correction IC 28b.

FIG. 11 illustrates an example of a configuration of the power factor correction IC 28b. The power factor correction IC 28b includes the driver circuit 40a, the discharge circuit 41, and a signal detection circuit 43. Note that FIG. 11 illustrates the terminals at positions different from the positions thereof in FIG. 10 for convenience, however, wiring, elements, and the like coupled to the terminals are the same between FIG. 10 and FIG. 11. The power factor correction IC 28b is different from the power factor correction IC 28a in not including the load determination circuit 42 and including the signal detection circuit 43.

Constituents in the power factor correction IC 28b that are the same as those illustrated in the power factor correction IC 28a are given the same reference numerals. The following mainly describes the power factor correction IC 28b with respect to differences from the power factor correction IC 28a.

The signal detection circuit 43 reads the state of the load 14 according to the time period for the feedback voltage Vfb to reach the ground voltage, and changes the level of the signal Ven according to the state of the load 14. Specifically, the signal detection circuit 43 outputs the high signal Ven indicating that the load 14 is not in the light load state, when the time period for the feedback voltage Vfb to reach the ground voltage is longer than the predetermined time period Tb. Meanwhile, the signal detection circuit 43 outputs the low signal Ven indicating that the load 14 is in the light load state, when the time period for the feedback voltage Vfb to reach the ground voltage is shorter than the predetermined time period Tb. This enables the signal detection circuit 43 to output the signal Ven as in the load determination circuit 42.

In an embodiment of the present disclosure, the NMOS transistor 38 and the signal detection circuit 43 are coupled to the terminal FB, and the signal detection circuit 43 detects the state of the load 14 according to the pulse width of the signal Sig, to output the signal Ven. As such, the existing terminal FB is used to detect the state of the load 14, thereby enabling the AC-DC converter 11b and the DC-DC converter 13 to operate cooperatively, without providing a dedicated terminal for communication. This facilitates miniaturization of the power supply device 10. Note that the terminal FB corresponds to a "third terminal".

As described above, the power factor correction IC 28b also makes it possible to discharge the capacitor 32 according to the state of the load 14, in response to the signal Sig. The discharge circuit 41 discharges the capacitor 32 when the load 14 is not in the light load state, and stops discharging it when the load 14 is in the light load state.

Accordingly, the power consumption of the power factor correction IC 28b when the load 14 is in the light load state decreases. Further, when the load 14 is not in the light load state, the power factor correction IC 28b can causes the voltage Vh to have a waveform similar to that of the rectified voltage Vrec. Accordingly, the power factor correction IC 28b can suppress the occurrence of the dead angle when the rectified voltage Vrec has a low phase angle, thereby improving the power factor and total harmonic distortion.

It is assumed, in an embodiment of the present disclosure, that the NMOS transistor 38 and the signal detection circuit 43 are coupled to the terminal FB, however, the power factor correction IC 28b may include another dedicated terminal, and the signal detection circuit 43 may be coupled to the dedicated terminal. In this case, the information on the state of the load 14 can be transmitted not by means of the pulse width of the signal Sig but by means of the level of the signal Sig inputted from the terminal, without providing the NMOS transistor 38, for example. The signal detection circuit 43 can detect the level of the signal Sig, to output the signal Ven according to the load state. In this case, the signal Sig itself corresponds to a "load determination signal".

<<Modification 2>>
==Configuration of Power Factor Correction IC 28c==

Figure 12:
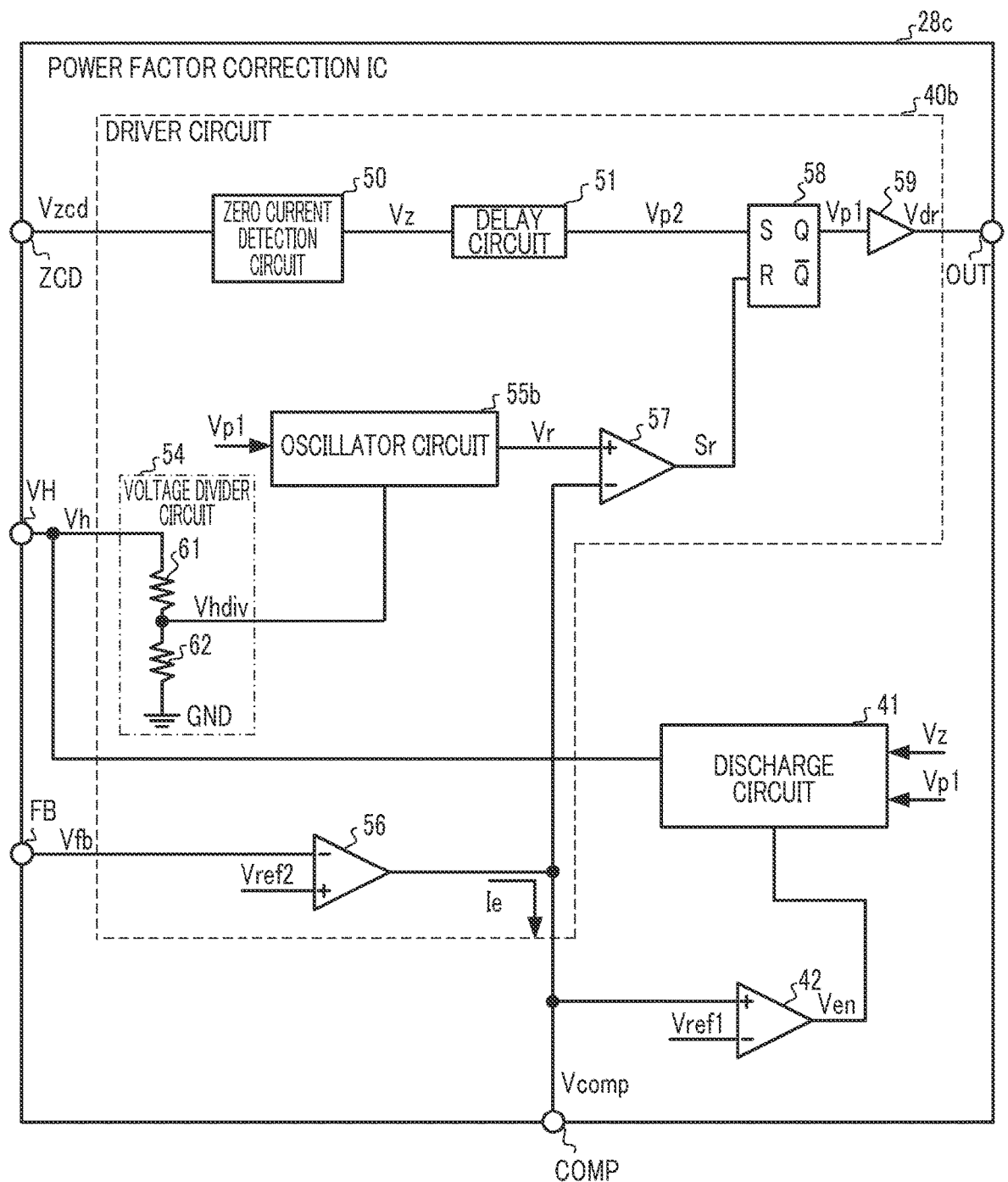
FIG. 12 illustrates an example of a configuration of a power factor correction IC 28c.

FIG. 12 illustrates an example of a configuration of a power factor correction IC 28c. The power factor correction IC 28c may be included in the AC-DC converter 11a in FIG. 1, in place of the power factor correction IC 28a.

The power factor correction IC 28c includes a driver circuit 40b, the discharge circuit 41, and the load determination circuit 42. The power factor correction IC 28c is different from the power factor correction IC 28a in including the driver circuit 40b.

Here, constituents in the power factor correction IC 28c that are the same as those illustrated in the power factor correction IC 28a are given the same reference numerals. The following mainly describes the power factor correction IC 28c with respect to differences from the power factor correction IC 28a.

The driver circuit 40b includes the zero current detection circuit 50, the delay circuit 51, the voltage divider circuit 54, an oscillator circuit 55b, the error voltage generator circuit 56, the comparator 57, the SR flip-flop 58, and the buffer circuit 59.

Although details will be described with reference to FIG. 13, the oscillator circuit 55b according to an embodiment of the present disclosure outputs the oscillating voltage Vr of a ramp wave with a slope that increases as the phase angle of the rectified voltage Vrec increases, and outputs the oscillating voltage Vr of a ramp wave with a slope that decreases as the phase angle of the rectified voltage Vrec decreases, according to the level of the voltage Vh. Accordingly, the lower the phase angle of the rectified voltage Vrec, the longer the time period for the oscillating voltage Vr to reach the voltage Vcomp, and the longer the on period of the NMOS transistor 29. Further, the higher the phase angle of the rectified voltage Vrec, the shorter the on period of the NMOS transistor 29.

==Operation of Driver Circuit 40b==

In an embodiment of the present disclosure, the driver circuit 40b operates as follows.

===Operation of the NMOS Transistor 29 from On to Off===

The oscillator circuit 55b supplies the oscillating voltage Vr of a ramp wave that gradually rises. In response to the oscillating voltage Vr from the oscillator circuit 55b reaching the voltage Vcomp, the comparator 57 outputs the high signal Sr.

In response to the high signal Sr, the SR flip-flop 58 outputs the low driving signal Vp1. In response to the low driving signal Vp1, the buffer circuit 59 outputs the low signal Vdr to turn off the NMOS transistor 29.

===Operation of NMOS Transistor 29 being Changed from Off to On===

Upon turning off of the NMOS transistor 29 of FIG. 1 described above, the inductor current IL flowing through the main coil L1 decreases. In response to the inductor current IL reaching zero, the zero current detection circuit 50 outputs the high signal Vz indicating that the current value of the inductor current IL is zero, based on the voltage Vzcd.

In response to the high signal Vz, the SR flip-flop 58 outputs the high driving signal Vp1 to turn on the NMOS transistor 29. In response to the high driving signal Vp1 to turn on the NMOS transistor 29, the buffer circuit 59 outputs the high signal Vdr.

==Configuration of Oscillator Circuit 55b==

Figure 13:
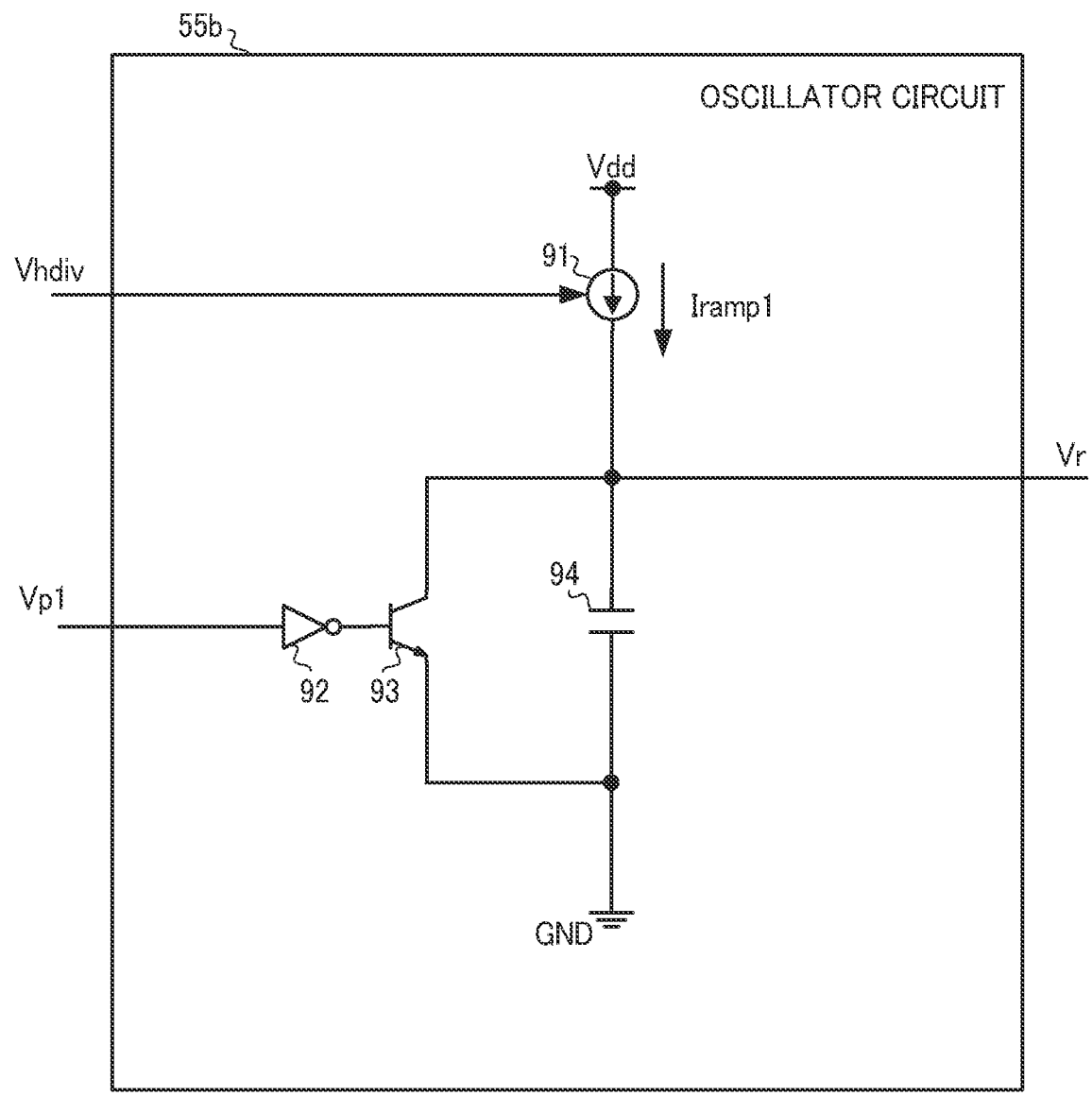
FIG. 13 illustrates an example of a configuration of an oscillator circuit 55b.

FIG. 13 illustrates an example of a configuration of the oscillator circuit 55b. The oscillator circuit 55b includes a current source 91, an inverter 92, a bipolar transistor 93, and a capacitor 94.

The current source 91 is a current source for supplying a current Iramp1 of a current value that is proportional to the voltage Vhdiv applied to the terminal VH.

The inverter 92 changes the level of the voltage applied to the base electrode of the bipolar transistor 93, in response to the driving signal Vp1, to thereby turn on and off the bipolar transistor 93. Specifically, the inverter 92 turns off the bipolar transistor 93, in response to the inductor current IL reaching substantially zero and the high driving signal Vp1 to turn on the NMOS transistor 29 being received. Meanwhile, the inverter 92 turns on the bipolar transistor 93 upon receipt of the low driving signal Vp1 to turn off the NMOS transistor 29.

Upon turning off of the bipolar transistor 93, the capacitor 94 is charged with the current Iramp1 supplied by the current source 91. Accordingly, a voltage of a rising ramp waveform is outputted as the oscillating voltage Vr. Here, the current value of the current Iramp1 is proportional to the absolute value of the voltage Vhdiv, and the absolute value of the voltage Vhdiv is proportional to the absolute value of the rectified voltage Vrec. Accordingly, the oscillator circuit 55b outputs the oscillating voltage Vr with a slope that decreases with a decrease in the phase angle of the rectified voltage Vrec, and the oscillating voltage Vr with a slope that increases with an increase in the phase angle of the input voltage.

Meanwhile, upon receipt of the low driving signal Vp1, the inverter 92 turns on the bipolar transistor 93, and the charge stored in the capacitor 94 is drawn through the bipolar transistor 93.

Note that a transistor other than the above, such as an NMOS transistor, a PMOS transistor or the like, may be used in place of the bipolar transistor 93.

==Operation Waveforms of AC-DC Converter 11a Including Power Factor Correction IC 28c==

Figure 14:
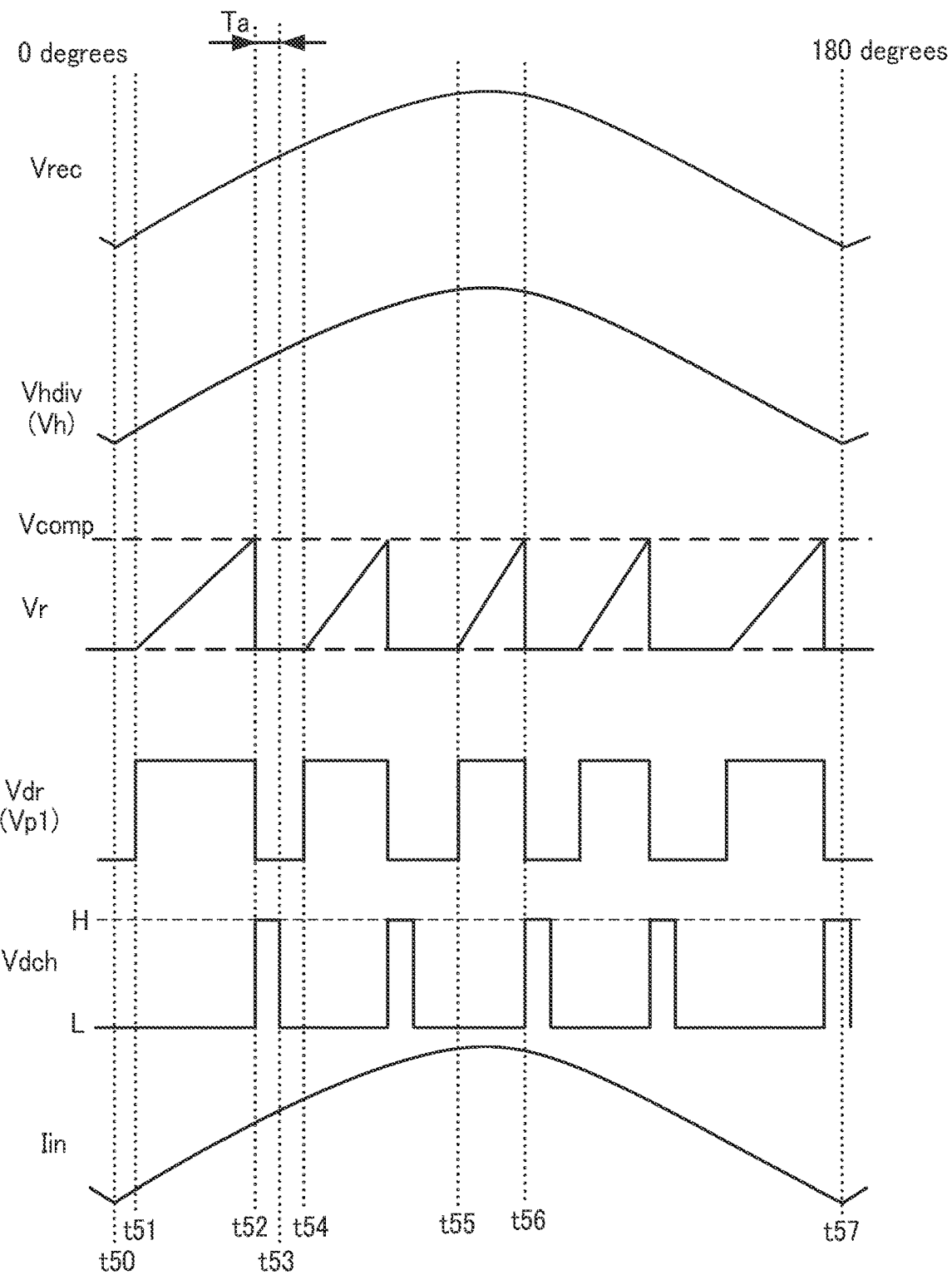
FIG. 14 illustrates an example of the main waveforms of voltages and currents in an AC-DC converter 11a including a power factor correction IC 28c.

FIG. 14 illustrates an example of the main waveforms of voltages and currents in the AC-DC converter 11a including the power factor correction IC 28c. At time t50, the phase angle of the rectified voltage Vrec is 0 degrees, and at time t57, the phase angle of the rectified voltage Vrec is 180 degrees. The operation of the power factor correction IC 28c during this time period will be described below.

At time t51, the SR flip-flop 58 of FIG. 12 outputs the high driving signal Vp1, and the buffer circuit 59 outputs the high signal Vdr to turn on the NMOS transistor 29. In response to the high driving signal Vp1, the bipolar transistor 93 of FIG. 13 is turned off, and the current source 91 supplies the current Iramp1 corresponding to the level of the voltage Vhdiv. Accordingly, the capacitor 94 is charged, and the oscillator circuit 55b outputs the oscillating voltage Vr of a ramp wave with a slope corresponding the height of the voltage Vhdiv.

At time t52, in response to the oscillating voltage Vr reaching the voltage Vcomp, the comparator 57 outputs the high signal Sr. This causes the SR flip-flop 58 to output the low driving signal Vp1, and the buffer circuit 59 outputs the low signal Vdr to turn off the NMOS transistor 29. From this timing, the AND circuit 86 of FIG. 4 applies the high voltage Vdch to the gate electrode of the NMOS transistor 81, in response to the low driving signal Vp1. This causes the discharge circuit 41 to start discharging the capacitor 32.

At time t53, in response to the timer circuit 85a of FIG. 4 having measured the time period Ta, the AND circuit 86 outputs the low signal Vdch, and the discharge circuit 41 stops discharging the capacitor 32.

At time t54, in response to the inductor current IL flowing through the main coil L1 of the transformer 24 reaching zero and becoming negative, a positive current flows through the auxiliary coil L2, and the positive voltage Vzcd is inputted to the S input of the SR flip-flop 58. This causes the SR flip-flop 58 to output the high driving signal Vp1, and the buffer circuit 59 outputs the high signal Vdr to turn on the NMOS transistor 29. Thereafter, the operation from time t51 to time t54 is repeated.

At time t55, the power factor correction IC 28c turns on the NMOS transistor 29, and at time t56, the power factor correction IC 28c turns off the NMOS transistor 29. Note that the on period of the NMOS transistor 29 from time t55 to time t56 is shorter than the on period of the NMOS transistor 29 from time t51 to time t52.

This is because, in the time period from time t55 to time t56, the current source 91 supplies the current Iramp1 that is larger than that in the time period from time t51 to time t52, according to the level of the voltage Vhdiv. This increases the charge stored in the capacitor 94, and increases the slope of the ramp wave of the oscillating voltage Vr outputted from the oscillator circuit 55b. Accordingly, the oscillating voltage Vr rises to the voltage Vcomp faster in the time period from time t55 to time t56 than in the time period from time t51 to time t52.

Accordingly, similarly to the power factor correction ICs 28a, 28b, in the power factor correction IC 28c, the time period during which the NMOS transistor 29 is on increases, as the phase angle of the rectified voltage Vrec decreases and the level of the voltage Vh decreases. Meanwhile, in the power factor correction IC 28c, the time period during which the NMOS transistor 29 is on decreases, as the phase angle of the rectified voltage Vrec increases and the level of the voltage Vh increases. Thus, the power factor correction IC 28c also eliminates the dead angle, thereby being able to improve the power factor and total harmonic distortion of the power supply circuit.

==Modification of Power Factor Correction IC==

In the power factor correction ICs 28a, 28b, with the slope of the oscillating voltage Vr being kept constant, the lower the phase angle of the rectified voltage Vrec, the higher the offset voltage at the rising edge of the oscillating voltage Vr, thereby increasing the time period for the oscillating voltage Vr to reach the voltage Vcomp. Further, in the power factor correction IC 28c, the lower the phase angle the rectified voltage Vrec, the smaller the slope of the oscillating voltage Vr, thereby increasing the time period for the oscillating voltage Vr to reach the voltage Vcomp.

As further modification, with the slope of the oscillating voltage Vr being kept constant, the voltage Vcomp is set higher as the phase angle decreases, and is set lower as the phase angle increases, thereby being able to increase the time period for the oscillating voltage Vr to reach the voltage Vcomp. The voltage Vcomp as such can be generated, for example, by inverting the voltage Vh (or the voltage Vhdiv) and then level shifting a resultant voltage.

Also, in a power factor correction IC including a circuit or element that generates the voltage Vcomp as such, it is possible to generate the voltage Vcomp that varies according to the phase angle, with the discharge circuit 41 being provided to the terminal VH. Accordingly, an AC-DC converter including this power factor correction IC also can eliminate the dead angle, thereby being able to improve the power factor and total harmonic distortion.

Other Embodiments

<<Power Factor Correction IC 110a>>

Figure 15:
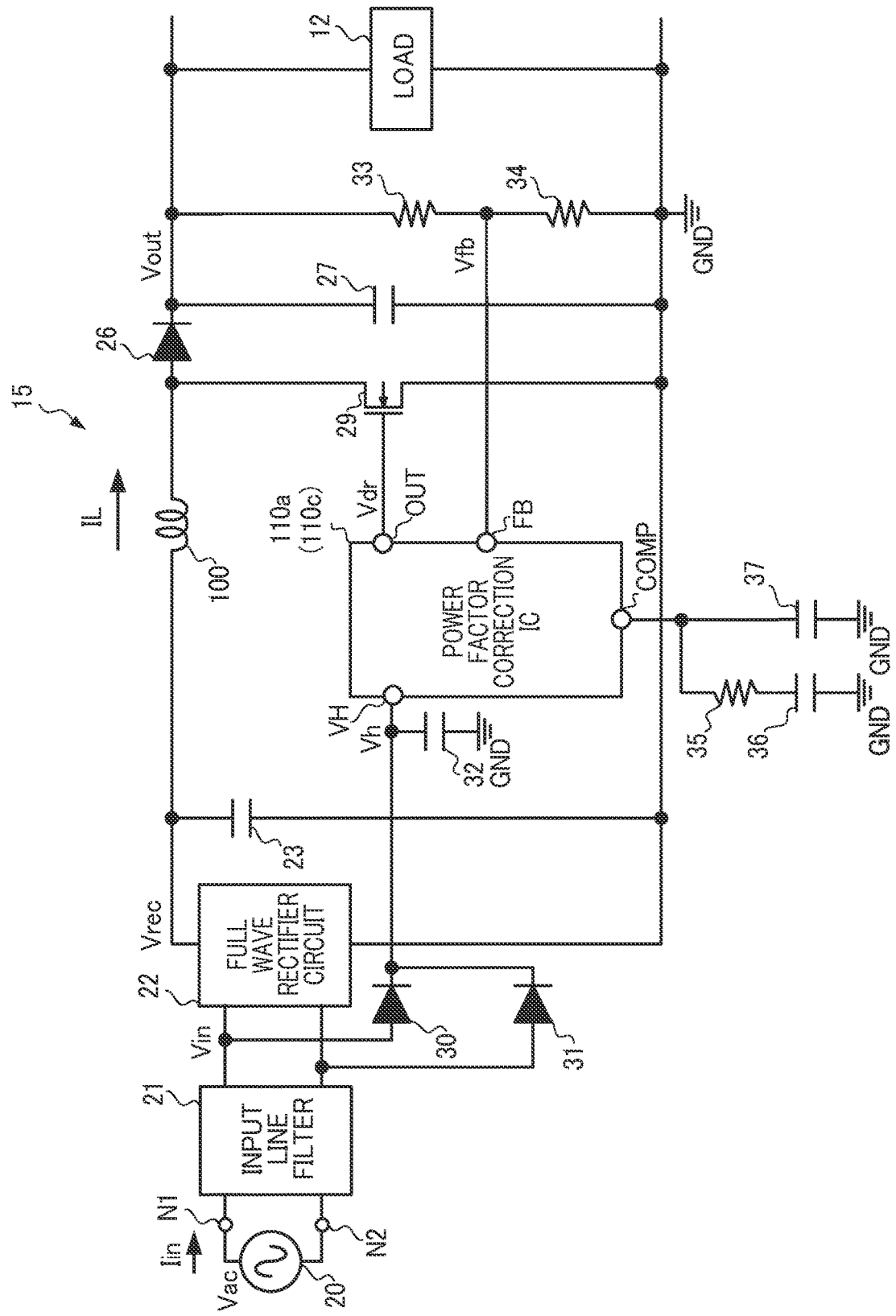
FIG. 15 illustrates an example of a configuration of an AC-DC converter 15.

FIG. 15 illustrates an example of a configuration of an AC-DC converter 15. The AC-DC converter 15 is a boost chopper power supply circuit that is similar to the AC-DC converter 11a. In the AC-DC converter 15, a coil 100 and a power factor correction IC 110a are used in place of the transformer 24 and the power factor correction IC 28a of the AC-DC converter 11a in FIG. 1, respectively.

The coil 100 is an element configuring a boost chopper circuit, similarly to the main coil L1 of FIG. 1.

Figure 16:
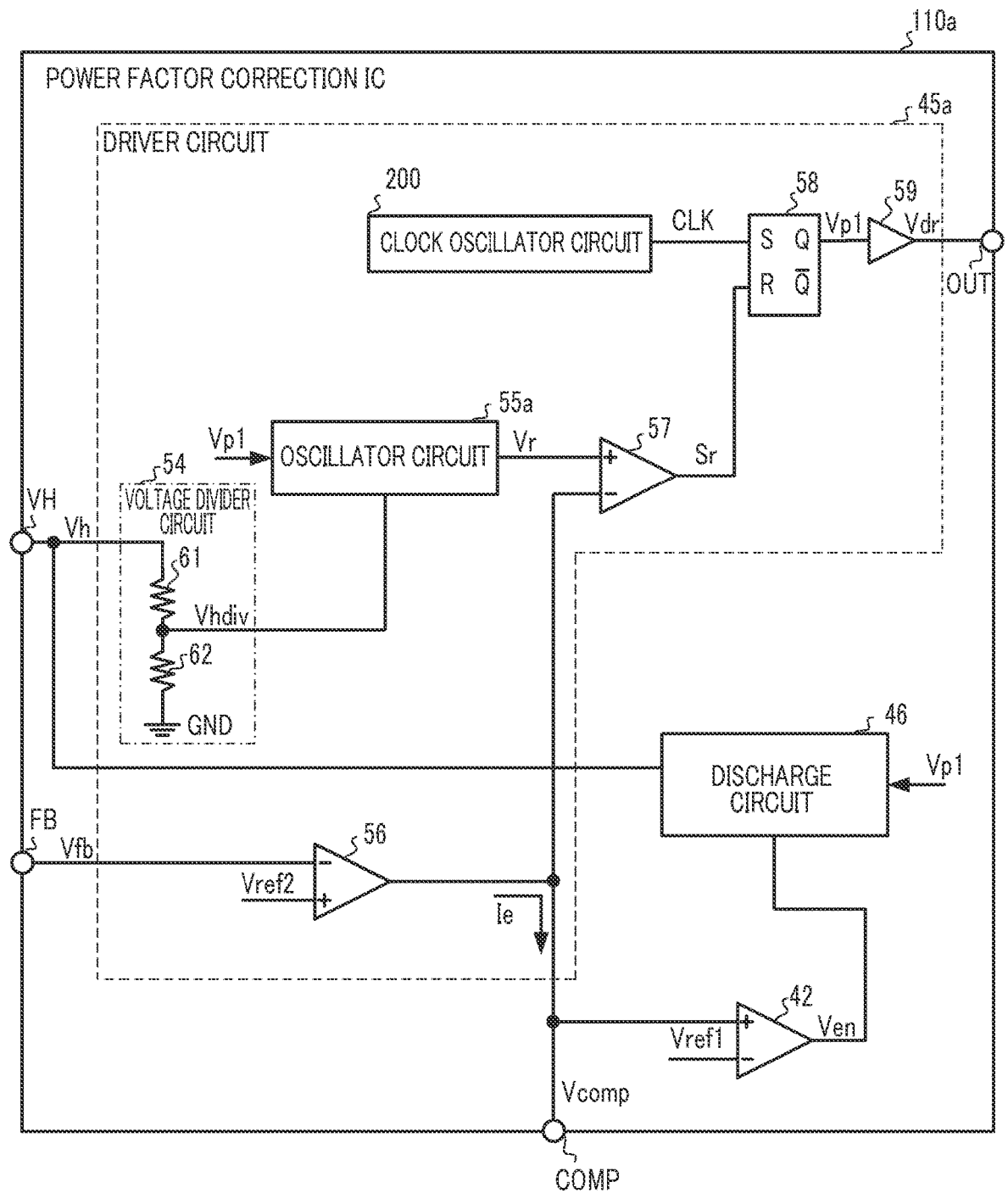

The power factor correction IC 110a is an integrated circuit to turn on the NMOS transistor 29 every predetermined period (i.e., fixed period). As illustrated in FIG. 16, the power factor correction IC 110a includes the load determination circuit 42, a driver circuit 45a, and a discharge circuit 46.

The driver circuit 45a turns on the NMOS transistor 29 every predetermined period, and turns off the NMOS transistor 29 in response to the oscillating voltage Vr reaching the voltage Vcomp. The driver circuit 45a includes the voltage divider circuit 54, the oscillator circuit 55a, the error voltage generator circuit 56, the comparator 57, the SR flip-flop 58, the buffer circuit 59, and a clock oscillator circuit 200.

When the driver circuit 45a is compared with the driver circuit 40a of FIG. 2, the configurations thereof are the same except for the clock oscillator circuit 200 that turns on the NMOS transistor 29 every predetermined period. Accordingly, the clock oscillator circuit 200 will be described below.

The clock oscillator circuit 200 outputs a signal CLK that goes high every predetermined period. Thus, the NMOS transistor 29 is turned on every predetermined period, and turned off in response to the oscillating voltage Vr reaching the voltage Vcomp.

Note that when the inductor current IL flowing through the coil 100 is positive (a current value larger than zero) upon turning on of the NMOS transistor 29, the AC-DC converter 15 (power factor correction circuit) operates in a current continuous mode.

Meanwhile, when the inductor current IL flowing through the coil 100 reaches zero upon turning on of the NMOS transistor 29, and thereafter resonates, the AC-DC converter 15 (power factor correction circuit) operates in a current discontinuous mode. Note here that the resonance of the inductor current IL occurs based on the parasitic capacitance of the NMOS transistor 29 and the coil 100, for example.

Figure 17:
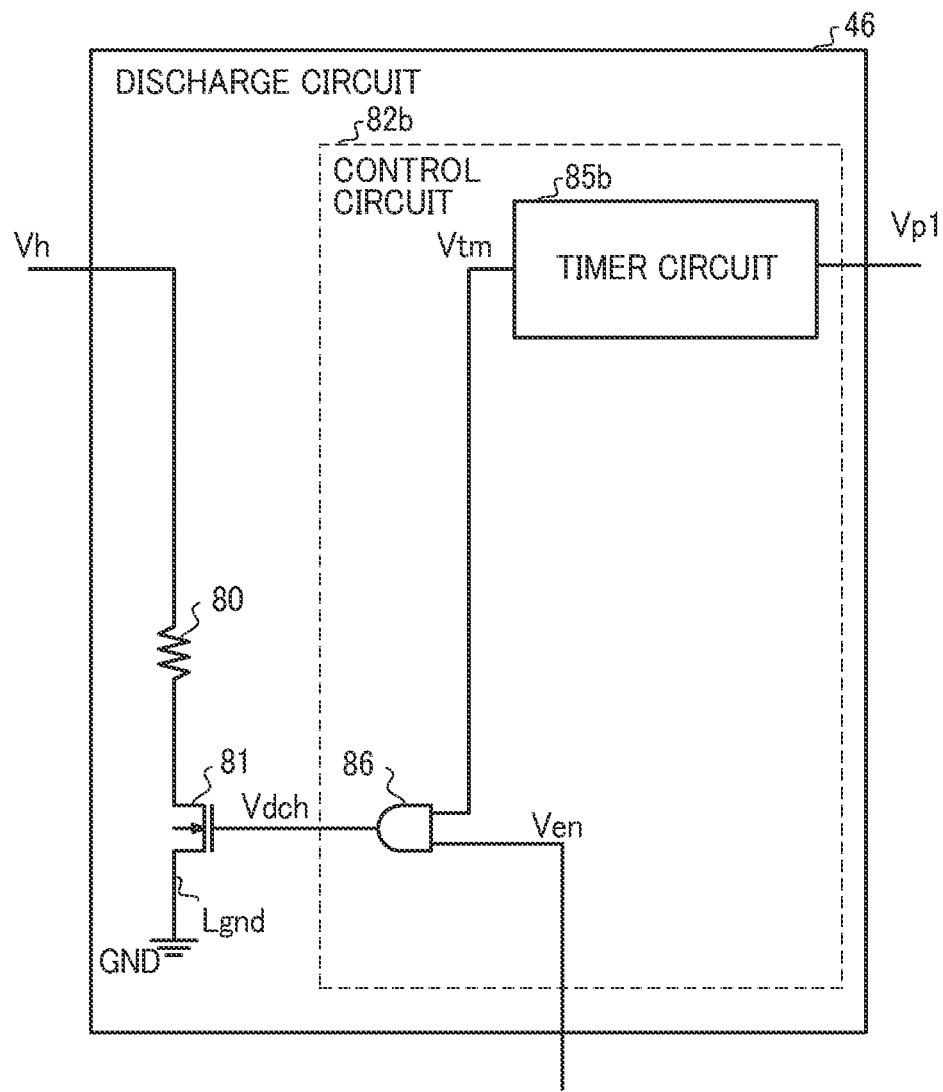
FIG. 17 illustrates an example of a configuration of a discharge circuit 46.

The discharge circuit 46 discharges the capacitor 32 coupled to the terminal VH while the NMOS transistor 29 is off, as in the discharge circuit 41 of FIG. 4. The discharge circuit 46 includes the resistor 80, the NMOS transistor 81, and a control circuit 82b, as illustrated in FIG. 17.

The control circuit 82b is similar to the control circuit 82a of FIG. 4, and includes a timer circuit 85b and the AND circuit 86.

The timer circuit 85b measures the time period Ta from the timing at which the NMOS transistor 29 is turned off, in response to the low driving signal Vp1. The timer circuit 85b outputs the high signal Vtm during the time period Ta, and the low signal Vtm during a time period other than the above time period. Note that, in an embodiment of the present disclosure, the time period Ta is shorter than a time period during which the signal CLK is low.

Even when the power factor correction IC 110a as such is used, it is possible to eliminate the dead angle of the AC-DC converter 15, to thereby improve the power factor and total harmonic distortion, as in the power factor correction IC 28a.

<<Power Factor Correction IC 110b>>

Figure 18:
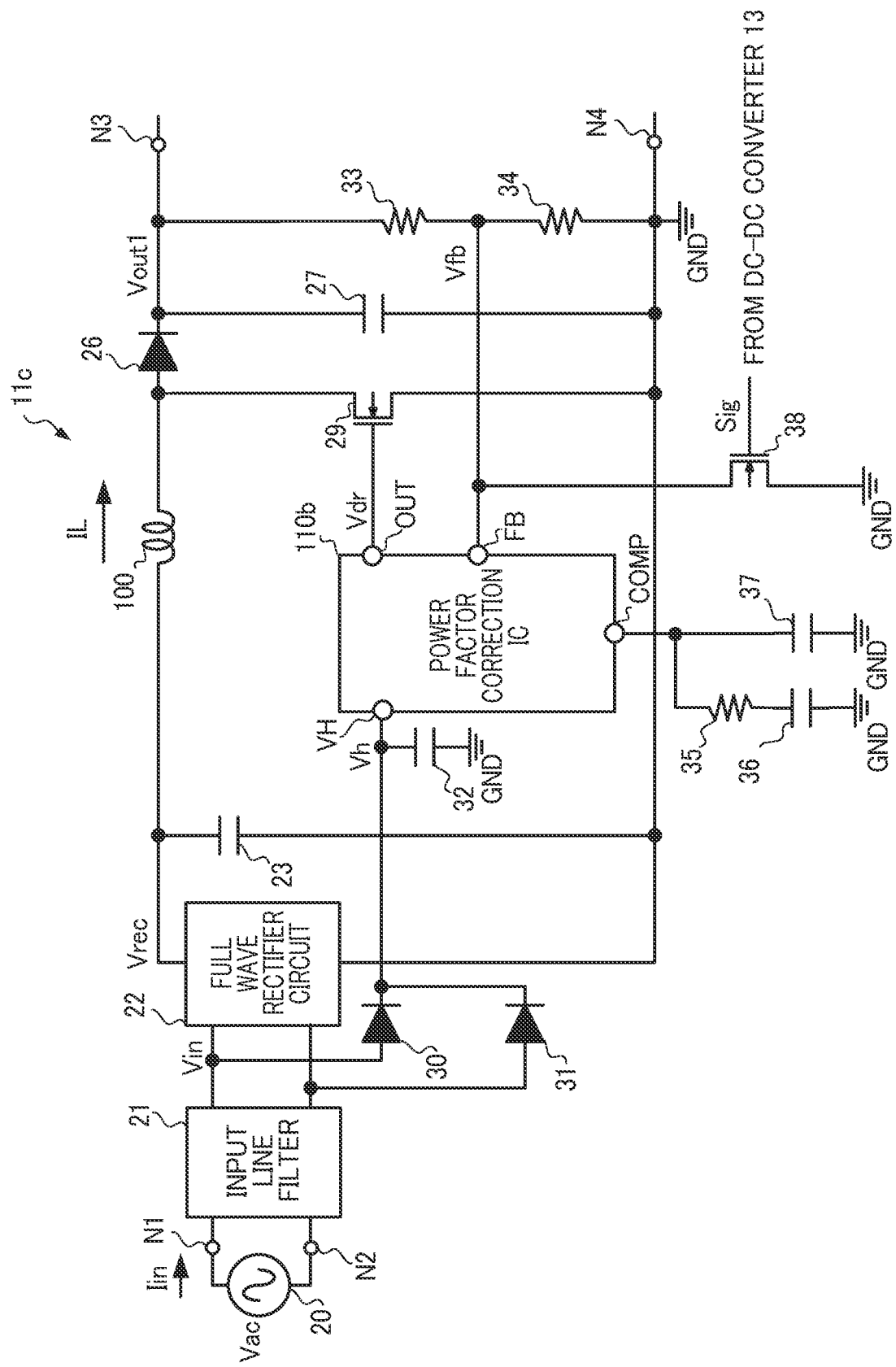
FIG. 18 illustrates an example of a configuration of an AC-DC converter 11c.

FIG. 18 illustrates an example of a configuration of an AC-DC converter 11c. The AC-DC converter 11c is a boost chopper power supply circuit that is similar to the AC-DC converter 11b of FIG. 10 used in the power supply device 10 of FIG. 9. In the AC-DC converter 11c, the coil 100 and a power factor correction IC 110b are used in place of the transformer 24 and the power factor correction IC 28b of the AC-DC converter 11b, respectively.

Figure 19:
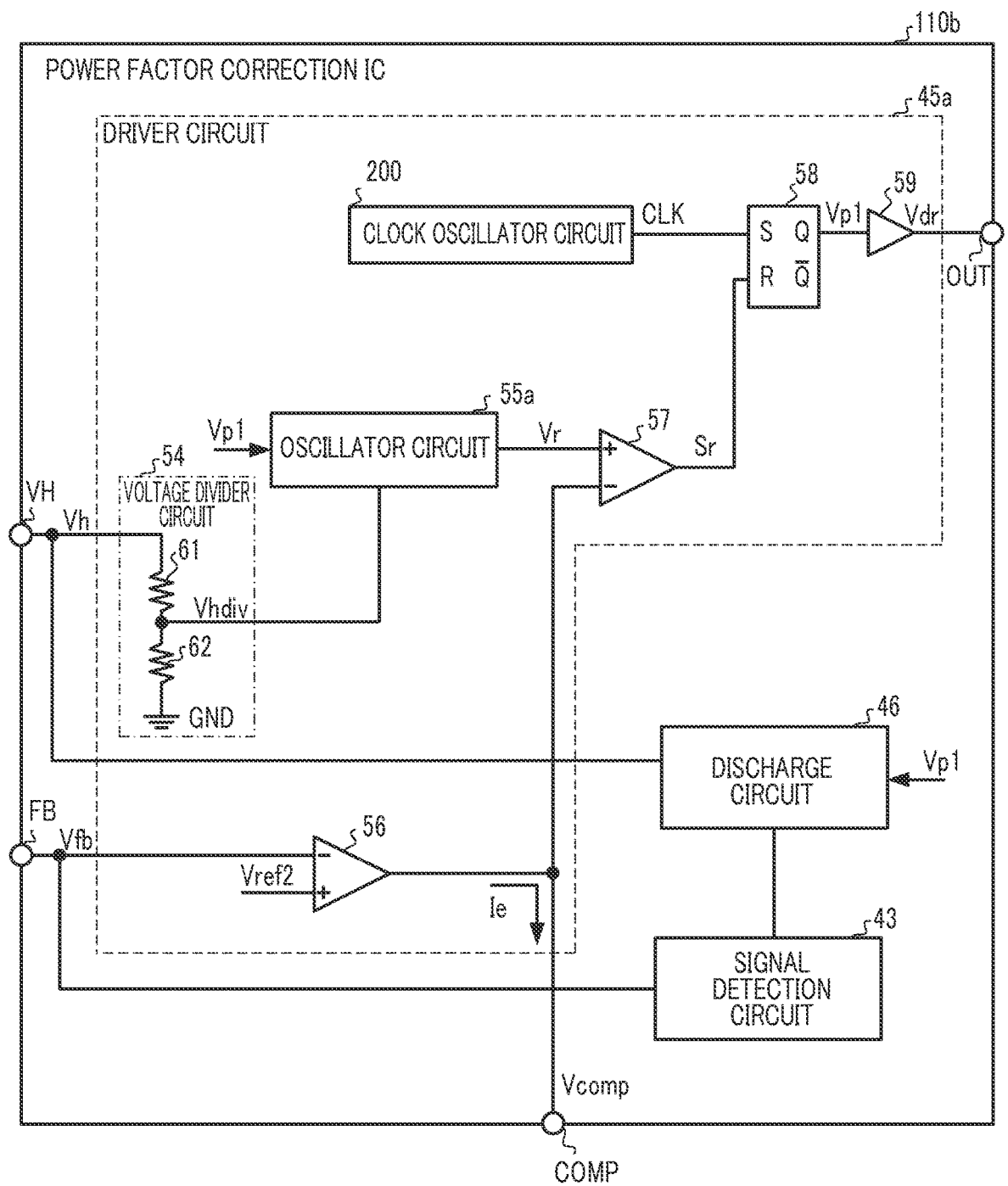
FIG. 19 illustrates an example of a configuration of a power factor correction IC 110b.

The power factor correction IC 110b is an integrated circuit that turns on the NMOS transistor 29 every predetermined period. As illustrated in FIG. 19, the power factor correction IC 110b includes the signal detection circuit 43, the driver circuit 45a, and the discharge circuit 46.

Even when the power factor correction IC 110b as such is used, it is possible to eliminate the dead angle of the AC-DC converter 11c, thereby improving the power factor and total harmonic distortion.

<<Power Factor Correction IC 110c>>

Figure 20:
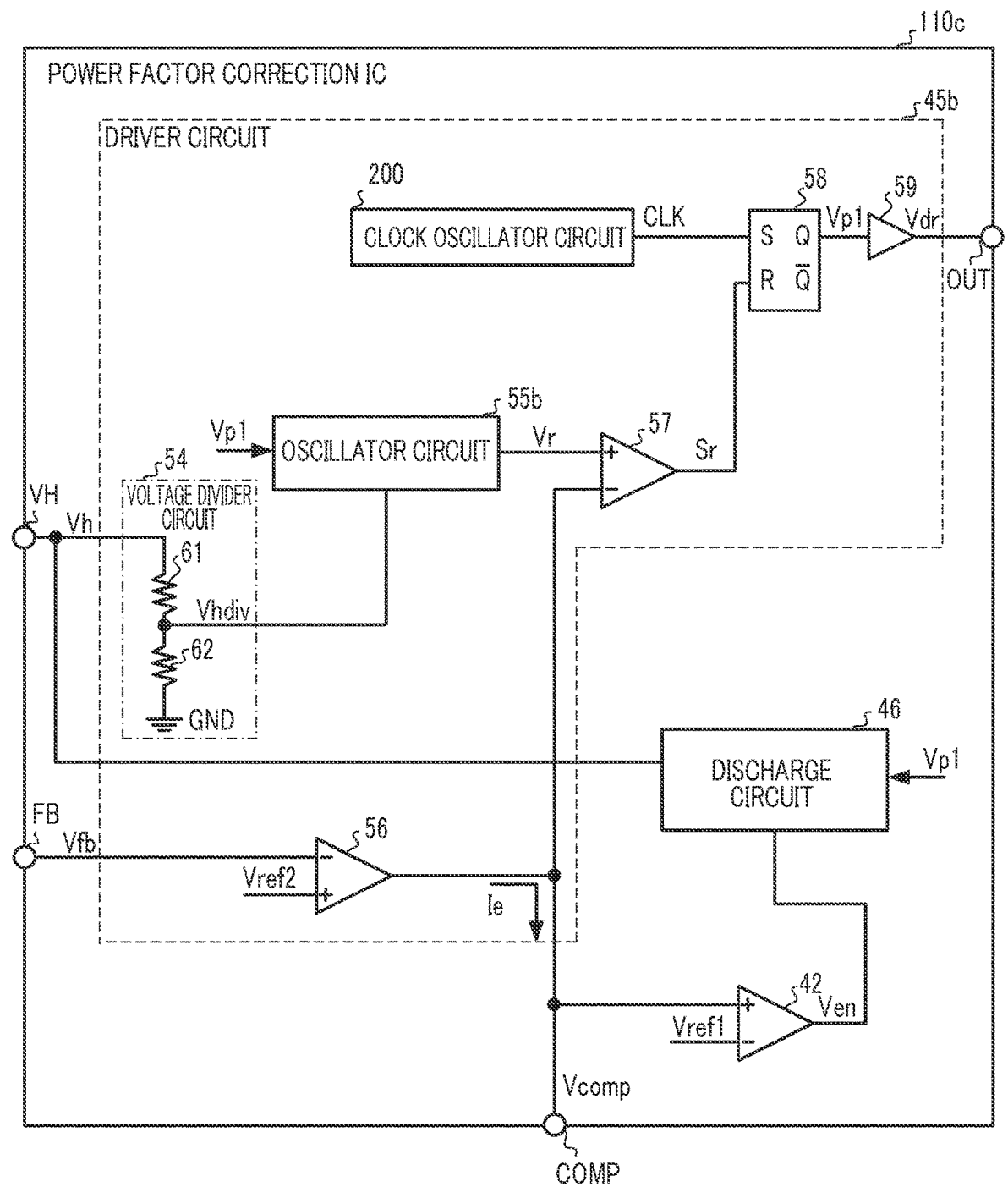
FIG. 20 illustrates an example of a configuration of a power factor correction IC 110c.

FIG. 20 illustrates an example of a power factor correction IC 110c. The power factor correction IC 110c can be used in the AC-DC converter 15, in place of the power factor correction IC 110a, for example.

The power factor correction IC 110c is an integrated circuit that turns on the NMOS transistor 29 every predetermined period, and includes the load determination circuit 42, a driver circuit 45b, and the discharge circuit 46.

The driver circuit 45b turns on the NMOS transistor 29 every predetermined period, and turns off the NMOS transistor 29 in response to the oscillating voltage Vr reaching the voltage Vcomp. The driver circuit 45b includes the voltage divider circuit 54, the oscillator circuit 55b, the error voltage generator circuit 56, the comparator 57, the SR flip-flop 58, the buffer circuit 59, and the clock oscillator circuit 200.

The driver circuit 45b uses the oscillator circuit 55b in place of the oscillator circuit 55a of the driver circuit 45a in FIG. 16.

Accordingly, even when the power factor correction IC 110c as such is used, it is possible to eliminate the dead angle of the AC-DC converter 15, thereby being able to improve the power factor and total harmonic distortion.

==Summary==

Hereinabove, descriptions have been given of the AC-DC converters 11a to 11c, 15, and the power factor correction ICs 28a to 28c, 110a to 110c according to embodiments of the present disclosure.

The power factor correction ICs 28a to 28c each include: the terminal VH to which the capacitor 32 is coupled, the terminal VH being configured to receive the voltage Vh; and the driver circuit 40a or 40b configured to turn on the NMOS transistor 29 in response to the inductor current IL being smaller than a predetermined value Ia, and turn off the NMOS transistor 29 based on the feedback voltage Vfb and the voltage Vh, such that the higher the level of the voltage Vh, the shorter a time period during which the NMOS transistor 29 is on, in other words, the on period of the NMOS transistor 29, during which the NMOS transistor 29 is on, inversely correlating to the level of the voltage Vh; and the discharge circuit 41 configured to discharge the capacitor 32 in the time period from the timing at which the NMOS transistor 29 is turned off to the timing at which the NMOS transistor 29 is tuned on.

This enables the discharge circuit 41 to discharge the capacitor 32 in the off period of the NMOS transistor 29, without affecting the operation in the on period of the NMOS transistor 29 in the power factor correction ICs 28a to 28c. The operation of the discharge circuit 41 maintains the waveform of the voltage Vh similar to the waveform of the rectified voltage Vrec. In this case, the power factor correction ICs 28a to 28c can perform control such that the lower the phase angle of the rectified voltage Vrec, the longer the on period of the NMOS transistor 29, based on the voltage Vh. As a result, the power factor correction ICs 28a to 28c can suppress the occurrence of the dead angle in a low phase angle of the rectified voltage Vrec, and improve the power factor and total harmonic distortion.

Note that the same effect can be obtained also when using the power factor correction IC 110a, 110b, 110c that causes a power factor correction circuit to operates in the current continuous mode or the current discontinuous mode, in place of the power factor correction IC 28a, 28b, 28c that causes a power factor correction circuit to operates in a critical mode.

The discharge circuit 41 discharges the capacitor 32 for the time period Ta from the timing at which the NMOS transistor 29 is turned off.

This enables the discharge circuit 41 to discharge the capacitor 32 in the time period during which the NMOS transistor 29 is off.

The discharge circuit 41 stops discharging the capacitor 32 upon a detection that the inductor current IL reaches the predetermined value Ia.

Thus, discharging of the capacitor 32 is stopped before the timing at which the NMOS transistor 29 is turned on. Accordingly, it is possible to prevent the discharging operation of the discharge circuit 41 from affecting the operation of the power factor correction ICs 28a to 28c during the on period of the NMOS transistor 29.

Further, in the power factor correction ICs 28a to 28c, the NMOS transistor 29 is turned on, in response to the inductor current IL becoming smaller than the predetermined value Ia. Accordingly, in this case, the phrase "a predetermined condition being satisfied" corresponds, for example, to the inductor current IL becoming smaller than the predetermined value Ia.

Further, in the power factor correction ICs 110a to 110c, the NMOS transistor 29 is turned on, in response to the signal CLK going high every predetermined period. Accordingly, in this case, the phrase "a predetermined condition being satisfied" corresponds, for example, to the signal CLK going high every predetermined period.

The driver circuit 40a, 40b include: the error voltage generator circuit 56 configured to generate the voltage Vcomp corresponding to an error between the feedback voltage Vfb and the reference voltage Vref2, the oscillator circuit 55a, 55b configured to output the oscillating voltage Vr corresponding to the level of the voltage Vh; the SR flip-flop 58 configured to output the driving signal Vp1 to turn on the NMOS transistor 29, in response to the inductor current IL becoming smaller than the predetermined value Ia, and output the driving signal Vp1 to turn off the NMOS transistor 29, in response to the oscillating voltage Vr reaching the voltage Vcomp; and the buffer circuit 59 configured to turn on and off the NMOS transistor 29 in response to the driving signal Vp1.

Accordingly, with the driver circuit 40a, 40b, when the waveform of the voltage Vh is maintained similar to the waveform of the rectified voltage Vrec, the lower the phase angle of the rectified voltage Vrec, the longer the on period of the NMOS transistor 29.

The driver circuit 40a, 40b includes the voltage divider circuit 54 that includes the resistor 61 having one end coupled to the terminal VH, and the resistor 62 having one end coupled to the other end of the resistor 61, and the oscillator circuit 55a is coupled to the node between the resistor 61 and the resistor 62.

This enables the oscillator circuit 55a to generate the oscillating voltage Vr, based on the voltage Vhdiv obtained by voltage division performed by the voltage divider circuit 54.

Further, the discharge circuit 41 includes the resistor 80 coupled to the terminal VH, the NMOS transistor 81 provided between the resistor 80 and the ground line Lgnd, and a control circuit 82.

This can implement the discharge circuit 41 that discharges the capacitor 32 in an appropriate time period.

Further, the resistance value of the resistor 80 is smaller than the resistance value of the resistor 61 and the resistance value of the resistor 62.

This enables the discharge circuit 41 to discharge the capacitor 32 in a sufficiently short time period in the off period of the NMOS transistor 29, even when the voltage divider circuit 54 is included.

Further, the oscillator circuit 55a outputs the oscillating voltage Vr having an offset voltage corresponding to the level of the voltage Vh, such that the higher the level of the voltage Vh, the shorter the on period of the NMOS transistor 29, and the lower the level of the voltage Vh, the longer the on period of the NMOS transistor 29, in other words, to thereby cause the on period of NMOS transistor 29 to inversely correlate to the level of the voltage Vh.

Thus, the power factor correction IC 28a, 28b causes the on period of the NMOS transistor 29 in the low phase angle of the rectified voltage Vrec to be longer than the on period thereof in the high phase angle. Accordingly, the dead angle of the input current Iin is eliminated, and the power factor and total harmonic distortion are improved.

Further, the oscillator circuit 55b outputs the oscillating voltage Vr with a slope corresponding to the level of the voltage Vh, such that the higher the level of the voltage Vh, the shorter the on period of the NMOS transistor 29, and the lower the voltage Vh, the longer the on period of the NMOS transistor 29, in other words, to thereby cause the on period of the NMOS transistor 29 to inversely correlate to the level of the voltage Vh.

As such, when using the oscillator circuit 55b that supplies the oscillating voltage Vr with a slope corresponding to the level of the voltage Vh as well, the power factor correction IC 28c can control the on period of the NMOS transistor 29 according to the phase angle of the rectified voltage Vrec. This eliminates the dead angle of the input current Iin in the low phase angle of the rectified voltage Vrec, and improves the power factor and total harmonic distortion.

Further, the power factor correction IC 28a, 28c further includes the terminal COMP to which the capacitor 36, 37 and the output of the error voltage generator circuit 56 are coupled, and the load determination circuit 42 configured to determine whether the load 12 is in the light load state, based on the voltage Vcomp applied to the terminal COMP, wherein the discharge circuit 41 is configured to stop discharging the capacitor 32 when the load 12 is in the light load state, and discharge the capacitor 32 in the time period from the timing at which the NMOS transistor 29 is turned off to the timing at which the NMOS transistor 29 is turned on, when the load 12 is not in the light load state.

This improves the power factor and total harmonic distortion, and reduce standby power consumption when the load 12 is in the light load state in a power supply circuit including the power factor correction IC 28a, 28b, 28c.

Further, the power factor correction IC 28b further includes the terminal FB configured to receive a signal corresponding to the pulse width of the signal Sig outputted from the DC-DC converter 13, which is an external circuit, the signal indicating the state of the load 14, wherein the discharge circuit 41 is configured to stop discharging the capacitor 32 upon receiving the signal indicating that the load 14 is in the light load state, and discharge the capacitor 32 in the time period from the timing at which the NMOS transistor 29 is turned off to the timing at which the NMOS transistor 29 is turned on, upon receiving the signal indicating that the load 14 is not in the light load state.

This makes it possible to detect the state of the load 14 using the existing terminal FB, thereby enabling the AC-DC converter 11b and the DC-DC converter 13 to operate cooperatively, without providing a dedicated terminal for communication. Further, in a power supply circuit including the power factor correction IC 28b, it is possible to improve the power factor and total harmonic distortion, and reduce standby power consumption when the load 14 is in the light load state.

Further, the AC-DC converter 11a, 11b includes the power factor correction IC 28a, 28b, or 28c.

This improves the power factor and total harmonic distortion in a power supply circuit including the AC-DC converter 11a, 11b.

The present disclosure provides an integrated circuit and a power supply circuit capable of improving power factor.

It is possible to provide an integrated circuit and a power supply circuit capable of improving power factor.

Hereinabove, the present disclosure has been described using embodiments. However, the technical scope of the present disclosure is not limited to the range described in above embodiments. It is apparent to those skilled in the art that above embodiments can be variously altered and modified. It is apparent from the claims that the technical scope of the present disclosure includes such altered or modified modes and equivalents thereof without departing from its essential features of the present disclosure.

It should be noted that the operations, procedures, steps, stages, and the like in each process in a device, a system, a program, and a method described in the claims, the specification, and the drawings may be performed in any order, unless a term such as "before", "prior to" or the like is explicitly used or an output of a previous process is used in a subsequent process. Even if terms such as "first", "next", and/or the like are used, for convenience, with respect to an operation flowchart in the claims, the specification, and the drawings, this does not mean that the flowchart needs to be performed in that order.

What is claimed is:

1. An integrated circuit for a power supply circuit configured to generate an output voltage of a target level from an alternating current (AC) voltage, the power supply circuit including
    an inductor configured to receive a rectified voltage corresponding to the AC voltage,
    a transistor configured to control an inductor current flowing through the inductor, and
    a first capacitor,
the integrated circuit being configured to switch the transistor, the integrated circuit comprising:
    a first terminal configured to receive a voltage corresponding to the AC voltage, the first terminal being coupled to the first capacitor;
    a driver circuit configured to
        turn on the transistor in response to a predetermined condition being satisfied, and
        turn off the transistor based on a feedback voltage corresponding to the output voltage and the voltage corresponding to the AC voltage, an on period of the transistor, during which the transistor is on, inversely correlating to a level of the voltage corresponding to the AC voltage; and
    a discharge circuit including
        a resistor coupled to the first terminal, and
        a switch provided between the resistor and a ground line, and
        a control circuit configured to control on and off of the switch,
so as to discharge the first capacitor in a time period from a first timing at which the transistor is turned off to a second timing at which the transistor is turned on.

2. The integrated circuit according to claim 1, wherein the discharge circuit discharges the first capacitor for a predetermined time period from the first timing.

3. The integrated circuit according to claim 1, wherein the driver circuit turns on the transistor, in response to the inductor current becoming smaller than a predetermined value.

4. The integrated circuit according to claim 3, wherein the discharge circuit stops discharging the first capacitor, upon a detection that the inductor current reaches the predetermined value.

5. The integrated circuit according to claim 1, wherein the driver circuit repeatedly turns on the transistor for a predetermined on period.

6. An integrated circuit for a power supply circuit configured to generate an output voltage of a target level from an alternating current (AC) voltage, the power supply circuit including
    an inductor configured to receive a rectified voltage corresponding to the AC voltage,
    a transistor configured to control an inductor current flowing through the inductor, and
    a first capacitor,
the integrated circuit being configured to switch the transistor, the integrated circuit comprising:
    a first terminal configured to receive a voltage corresponding to the AC voltage, the first terminal being coupled to the first capacitor;
    a driver circuit configured to
        turn on the transistor in response to a predetermined condition being satisfied, and
        turn off the transistor based on a feedback voltage corresponding to the output voltage and the voltage corresponding to the AC voltage, an on period of the transistor, during which the transistor is on, inversely correlating to a level of the voltage corresponding to the AC voltage; and
    a discharge circuit configured to discharge the first capacitor in a time period from a first timing at which the transistor is turned off to a second timing at which the transistor is turned on, wherein
the driver circuit turns on the transistor, in response to the inductor current becoming smaller than a predetermined value, and
the driver circuit includes
    an error voltage generator circuit configured to generate an error voltage corresponding to a difference between the feedback voltage and a reference voltage,
    an oscillator circuit configured to output an oscillating voltage corresponding to the level of the voltage corresponding to the AC voltage, in response to the inductor current becoming smaller than the predetermined value,
    a driving signal output circuit configured to
        output a driving signal to turn on the transistor, in response to the inductor current becoming smaller than the predetermined value, and
        output the driving signal to turn off the transistor, in response to the oscillating voltage reaching the error voltage, and
    a buffer circuit configured to turn on and off the transistor in response to the driving signal.

7. The integrated circuit according to claim 6, wherein the driver circuit further includes a voltage divider circuit that includes
    a first resistor having a first end coupled to the first terminal, and a second end, and
    a second resistor having a first end coupled to the second end of the first resistor, and
the oscillator circuit is coupled to a node between the second end of the first resistor and the first end of the second resistor.

8. The integrated circuit according to claim 7, wherein the discharge circuit includes
a third resistor coupled to the first terminal, and
a switch provided between the third resistor and a ground line, and
a control circuit configured to control on and off of the switch.

9. The integrated circuit according to claim 8, wherein a resistance value of the third resistor is smaller than a resistance value of the first resistor and a resistance value of the second resistor.

10. The integrated circuit according to claim 6, wherein the oscillating voltage outputted by the oscillator circuit has an offset voltage corresponding to the level of the voltage corresponding to the AC voltage, to thereby cause the on period of the transistor to inversely correlate to the level of the voltage corresponding to the AC voltage.

11. The integrated circuit according to claim 6, wherein the oscillating voltage outputted by the oscillator circuit has a slope corresponding to the level of the voltage corresponding to the AC voltage, to thereby cause the on period of the transistor to inversely correlate to the level of the voltage corresponding to the AC voltage.

12. The integrated circuit according to claim 8, wherein the power supply circuit further includes a second capacitor;
the integrated circuit further comprises:
a second terminal, to which the second capacitor and an output of the error voltage generator circuit are coupled; and
a determination circuit configured to determine whether a load of the power supply circuit is in a first load state, based on the error voltage applied to the second terminal; and
the discharge circuit is further configured to
stop discharging the first capacitor, when the load is in the first load state, and
discharge the first capacitor in the time period from the first timing to the second timing, when the load is not in the first load state.

13. The integrated circuit according to claim 8, further comprising:
a second terminal, to which an output of the error voltage generator circuit is coupled;
a third terminal configured to receive a load determination signal indicating a state of a load of the power supply circuit, wherein
the discharge circuit is configured to
stop discharging the first capacitor upon receiving the load determination signal indicating that the load is in a first load state, and
discharge the first capacitor in the time period from the first timing to the second timing, upon receiving the load determination signal indicating that the load is not in the first load state.

14. A power supply circuit configured to generate an output voltage of a target level from an alternating current (AC) voltage, the power supply circuit comprising:
an inductor configured to receive a rectified voltage corresponding to the AC voltage;
a transistor configured to control an inductor current flowing through the inductor;
a first capacitor; and
an integrated circuit configured to switch the transistor, the integrated circuit including
a first terminal to configured to receive a voltage corresponding to the AC voltage, the first terminal being coupled to the first capacitor,
a driver circuit configured to
turn on the transistor in response to a predetermined condition being satisfied, and
turn off the transistor based on a feedback voltage corresponding to the output voltage and the voltage corresponding to the AC voltage, an on period during which the transistor is on inversely correlating to a level of the voltage corresponding to the AC voltage, and
a discharge circuit including
a resistor coupled to the first terminal, and
a switch provided between the resistor and a ground line, and
a control circuit configured to control on and off of the switch,
so as to discharge the first capacitor in a time period from a first timing at which the transistor is turned off to a second timing at which the transistor is turned on.

15. The power supply circuit according to claim 14, wherein the driver circuit turns on the transistor, in response to the inductor current becoming smaller than a predetermined value.

16. The power supply circuit according to claim 14, wherein the driver circuit repeatedly turns on the transistor for a predetermined on period.

* * * * *